(12) United States Patent
Pantos et al.

(10) Patent No.: US 9,954,788 B2
(45) Date of Patent: Apr. 24, 2018

(54) BANDWIDTH ESTIMATION BASED ON STATISTICAL MEASURES

(75) Inventors: Roger Pantos, Cupertino, CA (US); Thai W. Then, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 954 days.

(21) Appl. No.: 13/153,372

(22) Filed: Jun. 3, 2011

(65) Prior Publication Data

US 2012/0307654 A1    Dec. 6, 2012

(51) Int. Cl.
*H04L 12/835* (2013.01)
*H04L 12/841* (2013.01)

(52) U.S. Cl.
CPC .......... *H04L 47/30* (2013.01); *H04L 47/283* (2013.01)

(58) Field of Classification Search
None
See application file for complete search history.

(56) References Cited

U.S. PATENT DOCUMENTS

| | | | |
|---|---|---|---|
| 5,359,593 A * | 10/1994 | Derby et al. .................. 370/234 |
| 6,438,141 B1 | 8/2002 | Hanko et al. |
| 6,625,656 B2 | 9/2003 | Goldhor et al. |
| 6,820,133 B1 | 11/2004 | Grove et al. |
| 7,002,918 B1 * | 2/2006 | Prieto et al. .................. 370/252 |
| 7,233,571 B1 | 6/2007 | Krishnamurthy et al. |
| 7,779,142 B1 * | 8/2010 | Greene .............. H04L 12/2801 370/235 |
| 8,346,959 B2 * | 1/2013 | Deshpande .................. 709/233 |
| 8,504,713 B2 * | 8/2013 | Arya et al. ..................... 709/231 |
| 8,856,373 B2 * | 10/2014 | Guo .................... H04L 12/5695 709/231 |
| 2005/0226249 A1 * | 10/2005 | Moore ................ H04L 12/5601 370/395.21 |
| 2007/0133603 A1 | 6/2007 | Weaver et al. |
| 2008/0049787 A1 | 2/2008 | McNaughton et al. |
| 2009/0080328 A1 | 3/2009 | Hu et al. |
| 2010/0241747 A1 * | 9/2010 | Guo .................... H04L 12/5695 709/225 |

(Continued)

OTHER PUBLICATIONS

U.S. Appl. No. 13/153,373, filed Jun. 3, 2011 Pantos, Roger, et al., Non-published commonly owned U.S. Appl. No. 13/153,373.

(Continued)

*Primary Examiner* — Hicham Foud
(74) *Attorney, Agent, or Firm* — Meyertons, Hood, Kivlin, Kowert & Goetzel, P.C.

(57) ABSTRACT

Some embodiments provide a method for estimating bandwidth estimate based on a set of statistical measurements that quantifies bandwidth variation. The method receives a piece of media content at a receiving device and computes several instantaneous bandwidth measurements based on sample data blocks or media content received at the receiving device. The method computes the set of statistical measures that quantifies variation between the computed instantaneous bandwidth measurements. Based on the set of statistical measures, the method computes a revised bandwidth estimate for receiving media content at the receiving device. In some embodiments, the method uses the revised bandwidth estimate to determine an amount of media content data to buffer in order to provide an uninterrupted playback.

9 Claims, 12 Drawing Sheets

(56) References Cited

U.S. PATENT DOCUMENTS

2010/0306373 A1* 12/2010 Wormley ............ H04L 67/1029
709/224
2012/0059951 A1* 3/2012 Gutarin ............... H04L 47/2416
709/233
2013/0007263 A1* 1/2013 Soroushian et al. .......... 709/224

OTHER PUBLICATIONS

Kwon, Jin B., et al., "A Statistical Admission Control Scheme for Continuous Media Servers Using Caching," Multimedia Tools and Applications, Month Unknown, 2003, Korea.
Saparilla, Despina, et al., "Streaming Stored Continuous Media over Fair-Share Bandwidth," Proceedings of the $12^{th}$ International Workshop on Network, Month Unknown, 2000.

* cited by examiner

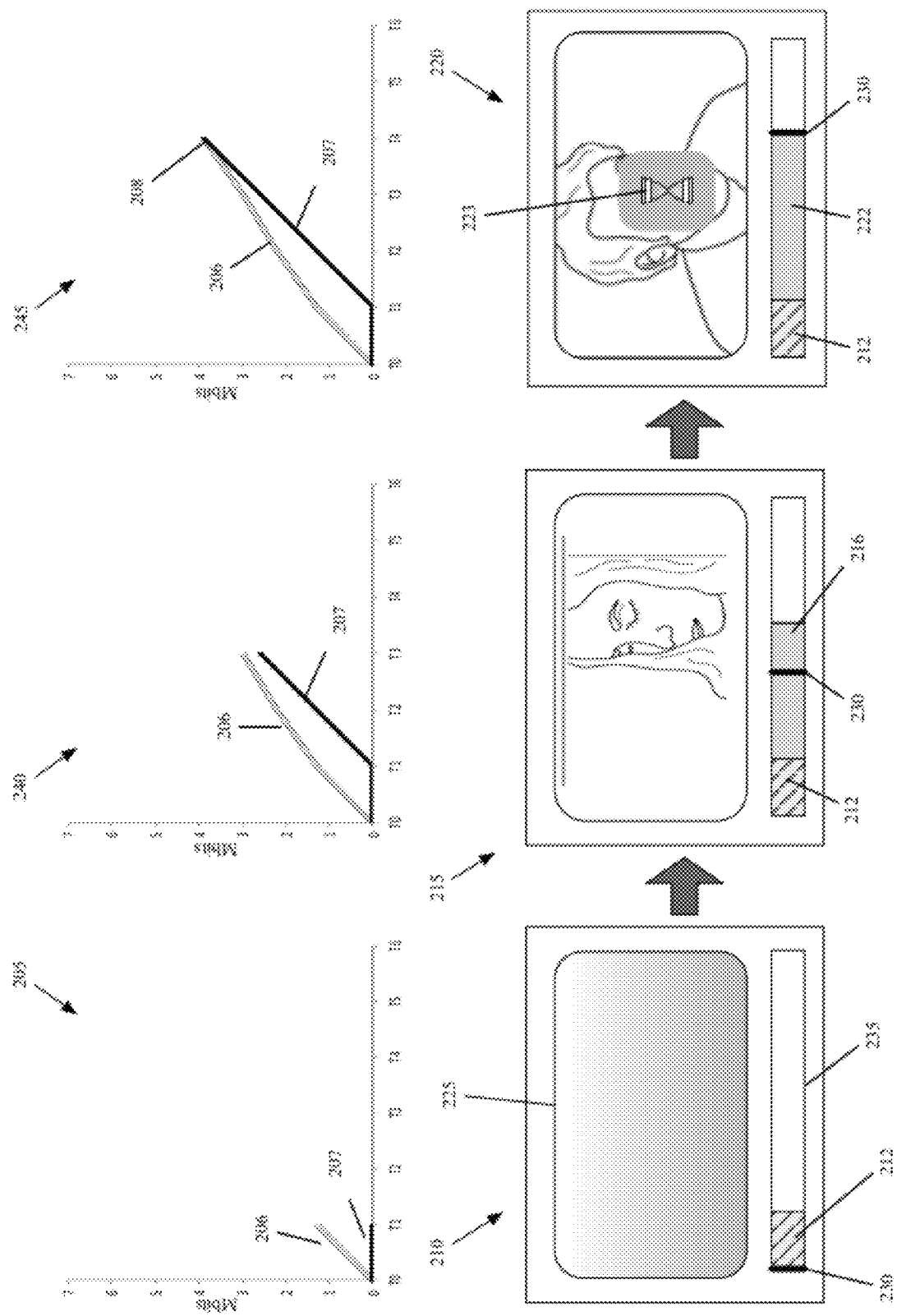

BANDWIDTH ESTIMATION BASED ON STATISTICAL MEASURES

BACKGROUND

A bandwidth generally refers to the amount of data that can be transmitted through the network per unit of time. Due to buffering and queuing of data en route to a destination device through a packet-switched network, the bandwidth fluctuates during the communication session. However, an accurate estimation of bandwidth is useful in many occasions. For instance, for playing back live media stream acquired over the Internet, an accurate estimation of bandwidth is essential in providing high quality user experience. The estimated bandwidth helps to determine a sufficient amount of media content to buffer before starting playback of the media content to ensure there will be no interruption during the playback.

In order to accurately estimate bandwidth, an initial bandwidth estimate is often handicapped. Handicapping an initial bandwidth estimate means presuming less bandwidth than the bandwidth estimate to account for bandwidth fluctuations. In the past, handicapping is often accomplished by applying a fixed value or a fixed percentage to the initial bandwidth estimate. However, the handicapped bandwidth derived by using this common technique sometimes suffers inaccuracies because it does not take bandwidth fluctuations into account. As a result, the revised bandwidth estimate is too conservative (i.e., too small) when the network bandwidth is quite stable, causing unnecessary delay in starting the playback. On the other hand, the revised bandwidth estimate is not conservative enough when the network bandwidth is wildly fluctuating, causing interruptions during the playback.

BRIEF SUMMARY

Some embodiments of the invention provide a novel method for estimating bandwidth during a communication session for receiving content at a receiving device from a content transmitting device. The method estimates bandwidth based on at least one statistical measure that quantifies bandwidth variation. In some embodiments, the method computes an initial bandwidth estimate based on several instantaneous bandwidth measurements that the method obtains at several different instances of time.

From the instantaneous bandwidth measurements, the method also calculates a bandwidth fluctuation, statistical measurement that quantifies variation in the instantaneous measurements. The method then uses this bandwidth fluctuation measurement to revise the initial bandwidth estimate (i.e., to compute a revised bandwidth estimate). In some embodiments, the method uses the statistical measurement to reduce the initial bandwidth estimate based on the bandwidth fluctuation. For instance, some embodiments reduce the initial bandwidth estimate by the statistical measurement based on an assumption that the bandwidth estimate at worst is smaller than the initial estimate by the bandwidth fluctuation measurement. By utilizing the bandwidth fluctuation measurement to compute the revised bandwidth estimate, the method of some embodiments handicaps the bandwidth estimate by a small value when the instantaneous bandwidth measurements have been stable, while handicapping the bandwidth estimate by a large value when the instantaneous bandwidth measurements have been wildly fluctuating.

Different embodiments compute different statistical measures to quantify the bandwidth fluctuation. In some embodiments, this statistical measurement is a standard deviation of instantaneous bandwidth measurements, a fraction of this deviation (e.g., one half of this deviation), or a multiple of this deviation (e.g., twice this deviation). Other embodiments quantify the bandwidth fluctuation in terms of other statistical measure, such as a variance, range, interquartile range, average absolute deviation, coefficient of variation, or other statistical measures to represent the bandwidth variation. Moreover, instead of computing one statistical measurement, some embodiments compute several statistical measurements that collectively quantify the bandwidth fluctuation, and then use these measurements to compute a revised bandwidth estimate from the initial bandwidth estimate.

Different embodiments differently compute the instantaneous bandwidth measurements from which the initial bandwidth estimate and the set of statistical measurements are computed. Also, different embodiments differently compute the initial bandwidth estimate from the instantaneous bandwidth measurements. For instance, in some embodiments, the method computes instantaneous bandwidth measurements at a particular interval. Different embodiments define the interval differently. For instance, the method of some embodiments defines the interval as a period of time. In other embodiments, the method also defines the interval as a set of packets. To compute the initial bandwidth estimate from the instantaneous bandwidth measurements, the method of some embodiments computes the average (i.e., the arithmetic mean) of all instantaneous bandwidth measurements and uses the average as the initial bandwidth estimate. Instead of, or in conjunction with, using an average, the method of other embodiments computes the initial bandwidth estimate by calculating the median of all instantaneous bandwidth measurements, or by computing some other averaging calculations.

During a communication session, the method of some embodiments computes only once a bandwidth estimate from one or more statistical measurements of one set of instantaneous bandwidth measurements. However, in other embodiments, the method periodically (1) computes an initial bandwidth estimate from several instantaneous measurements, (2) produces a set of statistical measurements for the instantaneous measurements, and (3) adjusts the initial bandwidth estimate based on the set of statistical measurements.

In some embodiments, the method uses the revised bandwidth estimate (e.g., uses the initial bandwidth estimate after it has been adjusted based on the computed standard deviation) to determine the minimum amount of media content data to buffer at the receiving device for an uninterrupted playback of the media content. The method of some embodiments starts playing back the media content at the receiving device when the method determines that a sufficient amount of media content data for an uninterrupted playback has been buffered. In some embodiments, the method sends a notification to the client that requested the media content to be played at the receiving device when the method determines that the receiving device has buffered a sufficient amount of media content data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 2A-B illustrate how different amount of media content data initially buffered can affect the process of media content playback.

DETAILED DESCRIPTION

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a novel method for estimating bandwidth during a communication session for receiving content at a receiving device from a content transmitting device. The method estimates bandwidth based on at least one statistical measure that quantifies bandwidth variation. In some embodiments, the method computes an initial bandwidth estimate based on several instantaneous bandwidth measurements that the method obtains at several different instances of time.

From the instantaneous bandwidth measurements, the method also calculates a bandwidth fluctuation, statistical measure that quantifies variation in the instantaneous measurements. The method then uses this bandwidth fluctuation measurement to revise the initial bandwidth estimate (i.e., to compute a revised bandwidth estimate). In some embodiments, the method uses the statistical measure to reduce the initial bandwidth estimate based on the bandwidth fluctuation. For instance, some embodiments reduce the initial bandwidth estimate by the statistical measure based on an assumption that the bandwidth estimate at worst is smaller than the initial estimate by the bandwidth fluctuation measurement. By utilizing the bandwidth fluctuation parameter to compute the revised bandwidth estimate, the method of some embodiments handicaps the bandwidth estimate by a small value when the instantaneous bandwidth measurements have been stable, while handicapping the bandwidth estimate by a large value when the instantaneous bandwidth measurements have been wildly fluctuating.

Figure 1:
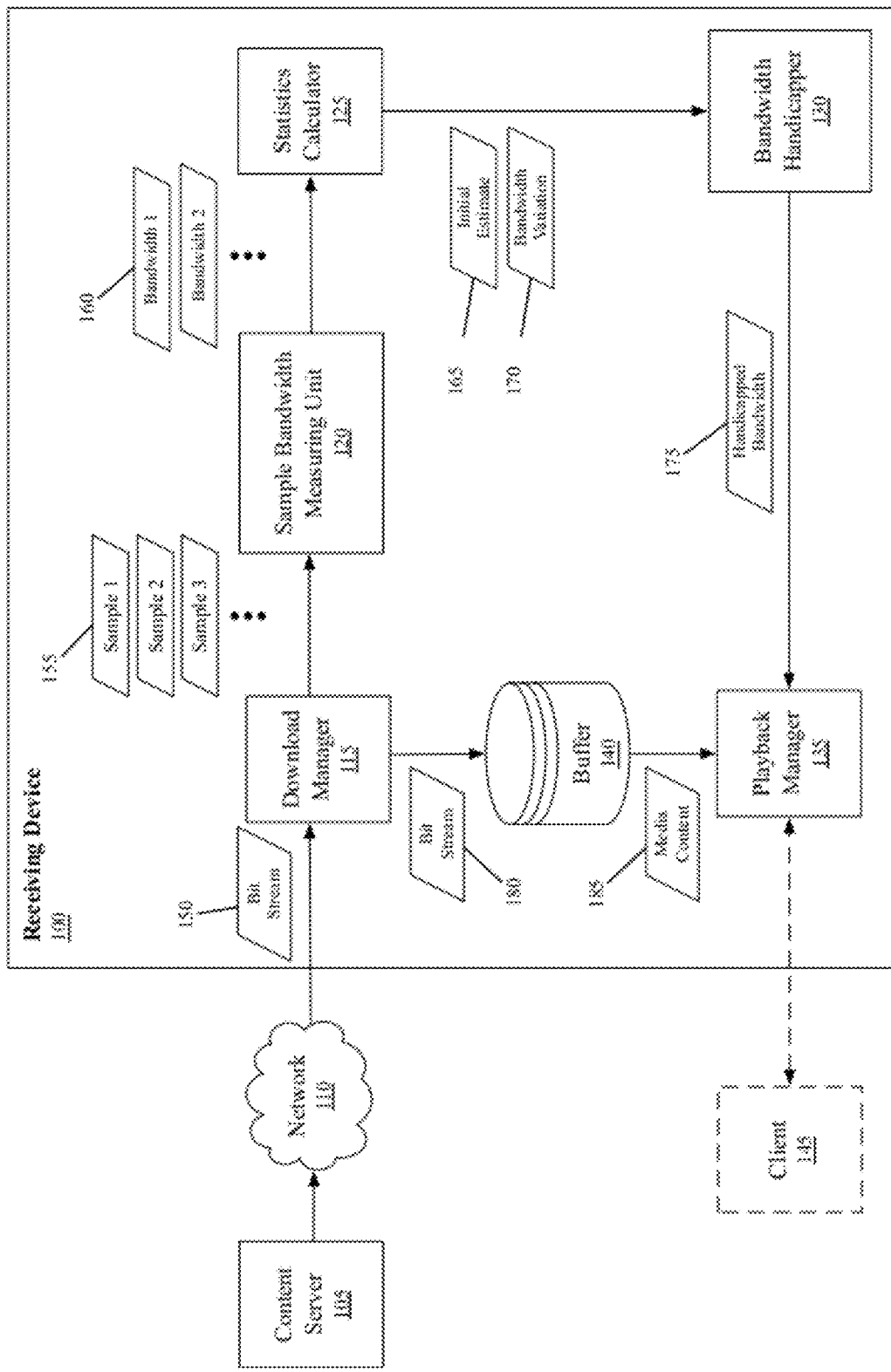
FIG. 1 conceptually illustrates a system architecture in some embodiments of a receiving device that estimates bandwidth based on a set of statistical measures.

FIG. 1 conceptually illustrates a system architecture of a receiving device of some embodiments that estimates bandwidth based on a set of statistical measures. Specifically, this figure illustrates an example of modules operating in a receiving device 100. These modules work in concert to compute an initial bandwidth estimate and then revise the initial bandwidth estimate based on a set of statistical measures regarding the current bandwidth. The receiving device of some embodiments uses the revised bandwidth estimate to determine the amount of media content data to be initially buffered at the receiving device for an uninterrupted playback. In some embodiments, the media content is data that a computing device processes in order to provide a media presentation to a user of the device. Examples of different types of such media content include audio data, video data, text data, picture data, game data, and/or other media data.

FIG. 1 illustrates a content server 105, a network 110, a receiving device 100, and a client 145. As shown in the figure, the receiving device 100 includes a download manager 115, a sample bandwidth measuring unit 120, a statistics calculator 125, a bandwidth handicapper 130, a playback manager 135, and a buffer 140.

The content server 105 is a content transmission device that stores media content and receives requests from other devices for the media content. Once a request is received and processed, the content server 105 converts the requested media content into a bit stream and sends it to the requesting party, e.g., the receiving device 100. The content server 105 transmits data to another device through a connection between the two devices over the network 110. In some embodiments, the network 40 is a packet switched network such as the Internet. Some examples of a content server include an electronic device such as a server, a desktop, a laptop, a netbook, a tablet computer, a smartphone, etc. that is capable of sending and receiving data to and from another device. In some cases, one or more devices provide the requested media content. The content server 105 could also be part of a content delivery network (CDN). A CDN is a system of computers containing copies of data placed at various nodes of a network.

On the receiving end of the connection, the receiving device 100 receives the data stream 150 and analyzes the stream in order to compute networking data regarding the connection between the content server 105 and the receiving device 100. In some embodiments, the networking data that the receiving device 100 computes includes an initial bandwidth estimate and a revised bandwidth estimate. In some embodiments, the receiving device 100 is an electronic device such as a desktop, a laptop, a netbook, a tablet computer, a smartphone, an Apple TV®, etc. that is capable of sending and receiving data to and from another device.

The download manager 115 of the receiving device 100 receives the bit stream 150, processes it, and sends the processed data to other modules of the receiving device 100. Specifically, the download manager 115 first removes any overhead of network data transmission, e.g., packet header, frame header, error correction information (ECI), etc., from the bit stream 150. As a result, a new bit stream 180 that includes the data portion of the incoming bit stream 150 (i.e., the media content) is created. The download manager 115 sends the new bit stream 180 to the buffer 140 to temporarily store the media content data. The download manager 115 also sends several sample data blocks 155 of the bit stream 180 to the sample bandwidth measuring unit 120. In some embodiments, the several sample data blocks 155 are all of the data that has been downloaded so far.

The sample bandwidth measuring unit 120 receives the sample data blocks 155 from the download manager 115 and calculates several instantaneous bandwidth measurements 160 based on these sample data blocks. In some embodiments, these several instantaneous bandwidth measurements are all the instantaneous bandwidth measurements that the sample bandwidth measuring unit 120 has calculated so far. In some embodiments, the sample bandwidth measuring unit groups several sample data blocks into a bucket at a regular interval (e.g., a temporal interval or an interval based on number of sample data blocks). The sample bandwidth measuring unit then computes an instantaneous bandwidth measurement using the sample data blocks grouped in a bucket. For instance, the sample bandwidth measuring unit computes an instantaneous bandwidth by dividing the total amount of data in the bucket by the length of time taken to receive the sample data blocks in the bucket. In this manner, the sample bandwidth measuring unit smoothens the effect of an unusually small or big sample data block on the bandwidth measurement.

The statistics calculator 125 receives several instantaneous bandwidth measurements 160 and computes a set of statistical measures for those instantaneous bandwidth measurements. One statistical measure in the set is an estimate of the bandwidth of the connection. In some embodiments, the statistics calculator 125 estimate the bandwidth initially by taking an average of the instantaneous bandwidth measurements. Another statistical measure in the set quantifies bandwidth variation of the current connection. In some embodiments, the statistics calculator 125 quantifies the variation in bandwidth by computing a standard deviation of the instantaneous bandwidth measurements. Examples of statistical measures that the statistics calculator 125 computes to quantify variation of the instantaneous bandwidths also include variance, range, interquartile range, average absolute deviation, coefficient of variation, and so on. The statistics calculator 125 sends the set of statistical measures that includes a bandwidth estimate 165 and a bandwidth variation 170 to the bandwidth handicapper 130.

Once receiving the set of statistical measures, the bandwidth handicapper 130 revises the initial bandwidth estimate 165 by handicapping the bandwidth estimate 165 based on the bandwidth variation 170. As described above, handicapping a bandwidth estimate is reducing the bandwidth estimate by a handicap value in order to account for bandwidth fluctuations. When the bandwidth variation is small, the bandwidth handicapper 130 handicaps the bandwidth estimate 165 with a small value. However, when the bandwidth variation is large, the bandwidth handicapper 130 applies a large handicap to the bandwidth estimate 165. In some embodiments, the bandwidth handicapper 130 revises the bandwidth estimate 165 by reducing the bandwidth estimate with a multiple of the bandwidth variation 170. The bandwidth handicapper 130 then sends the handicapped bandwidth 175 to the playback manager 135.

The playback manager 135 retrieves the media content 185 from the buffer 140 for a playback. In order to ensure that there will not be any stall (i.e., running out of media data) during the playback, the playback manager 135 determines the minimum amount of media content data to be stored in the buffer 140 before starting the playback of the media content. The playback manager 135 uses the received handicapped bandwidth 175 to make that determination.

When the playback manager 135 finds out that there is a sufficient amount of media content data in the buffer 140 for an uninterrupted playback of the media content, it will either start the playback at the receiving device 100 or send a notification to the client 145. In the latter case, the client 145 will determine an appropriate time to start the playback. In some embodiments, the client 145 is a third party application using the receiving device 100. For example, the client 145 could be live video stream subscription service applications like MLB.tv®, WatchESPN®, etc. These applications allow users to view live video streams through an Internet browser or a video game console (e.g., PlayStation 3®) by delegating most of the media data download and playback tasks to the receiving device 100.

In some embodiments, the receiving device 100 provides its functionalities to the client 145 through a high level application programming interface (API). The client 145 uses a functionality of the receiving device 100 by invoking a corresponding API function and passing a URL link to a particular piece of media content as a parameter. The receiving device 100 then performs the functionality. For instance, the receiving device 100 may download the piece of media content, play back the media content, and show several user selectable controls (e.g., for playing back, fast forwarding, rewinding, etc.).

An example operation of the receiving device 100 will now be described. The content server 105 and the receiving device 100 establish a connection between them over the network 110 and start a communication session by exchanging data between them. By its own initiative (i.e., based on user inputs) or by a request from the client 145, the receiving device 100 requests a piece of media content from the content server 105. After receiving the request, the content server 105 generates the bit stream 150 enclosing the requested piece of media content and sends the bit stream to the receiving device 100 over the network 110.

The download manager 115 receives the bit stream 150 and extracts the requested media content out of the stream (e.g., by removing headers, etc.). The extracted media content is then sent to buffer 140 as a new bit stream 180. The buffer 140 stores media content for consumption by the playback manager 135.

The download manager also sends several sample data blocks 155 of the extracted media content to the sample bandwidth measuring unit 120. The sample bandwidth measuring unit 120 computes a set of instantaneous bandwidth measurements. In this example, the measurements are 1.9 Mbit/s, 1.8 Mbit/s, 0.5 Mbit/s, 0.3 Mbit/s, and 0.5 Mbit/s. Mbit/s is mega bits per second. The sample bandwidth measuring unit 120 then sends these computed instantaneous bandwidth measurements 160 to the statistics calculator 125 to calculate an average bandwidth 165 and a standard deviation 170. In this example, the average of these instantaneous bandwidth measurements and the standard deviation that the statistics calculator 125 calculates are 1 Mbit/s and 0.7, respectively.

Subsequently, the statistics calculator 125 sends the calculated average bandwidth 165 and standard deviation 170 to the bandwidth handicapper 130. The bandwidth handicapper 130 computes the revised bandwidth estimate. The bandwidth handicapper 130 computes the revised bandwidth estimate by handicapping the average bandwidth 165 based on the standard deviation 170. More specifically, the bandwidth handicapper 130 in this example reduces the average bandwidth 165 by the standard deviation 170 to compute the revised bandwidth estimate. The resulting revised bandwidth estimate is 0.3 Mbit/s (1.0 Mbit/s−0.7).

The bandwidth handicapper then sends the revised bandwidth estimate, i.e., handicapped bandwidth 175, to the playback manager 135. The playback manager 135 uses the revised bandwidth estimate 175 to determine an amount of media content data to buffer in order to ensure an uninterrupted playback of the media content. Assuming the media content data consumption rate is 0.5 Mbit/s and the playback duration of the piece of media content is 100 seconds, the playback manager 135 calculates that the amount of media content data to be buffered is 20 Mbit for an uninterrupted playback of the piece of media content.

When the playback manager 135 determines that there is more than 20 Mbit of media content data buffered at the buffer 140, the playback manager 135 starts playback of the media content 185 that it retrieves from the buffer 140.

FIG. 1 provides a system-level overview of the modules and how the modules interact with each other. Several more detailed embodiments are described below. However, irrespective of the examples described above and below, one of ordinary skill in the art will realize that other embodiments might use other statistical measures to compute the revised bandwidth estimate. For instance, instead of averaging (i.e., computing the arithmetic mean of) the instantaneous bandwidths, some embodiments might use a median of the instantaneous bandwidth. In addition, some embodiments might use variance, range, interquartile range, average absolute deviation, or coefficient of variation instead of a standard deviation of the instantaneous bandwidths.

Different embodiments compute revised bandwidth estimate for different number of times. For instance, during a communication session, the receiving device 100 of some embodiments computes only once a bandwidth estimate from one or more statistical measurements of one set of instantaneous bandwidth measurements as described above. However, in other embodiments, the receiving device 100 periodically (1) computes an initial bandwidth estimate from several instantaneous measurements, (2) produces a set of statistical measurements for the instantaneous measurements, and (3) revises the initial bandwidth estimate based on the set of statistical measurements. In this manner, the revised bandwidth estimate becomes more accurate because the measurements are computed based on more sample data.

Several more detailed embodiments of the invention are described below. Section I describes different situations in which different amounts of media content data are buffered before starting playback of the media content. Section II then describes the calculation of statistical measures and the computation of a revised bandwidth estimate based on the calculated statistical measures. Next, Section III describes the manner in which some embodiments coalesce sample data blocks into data buckets of fixed time length to smooth out bandwidth fluctuations caused by lower level buffering mechanism. Section IV then describes applications of some embodiments of this invention. Finally, Section V describes an electronic system with which some embodiments of the invention are implemented.

I. Buffering for Media Content Playback

Figure 2B:
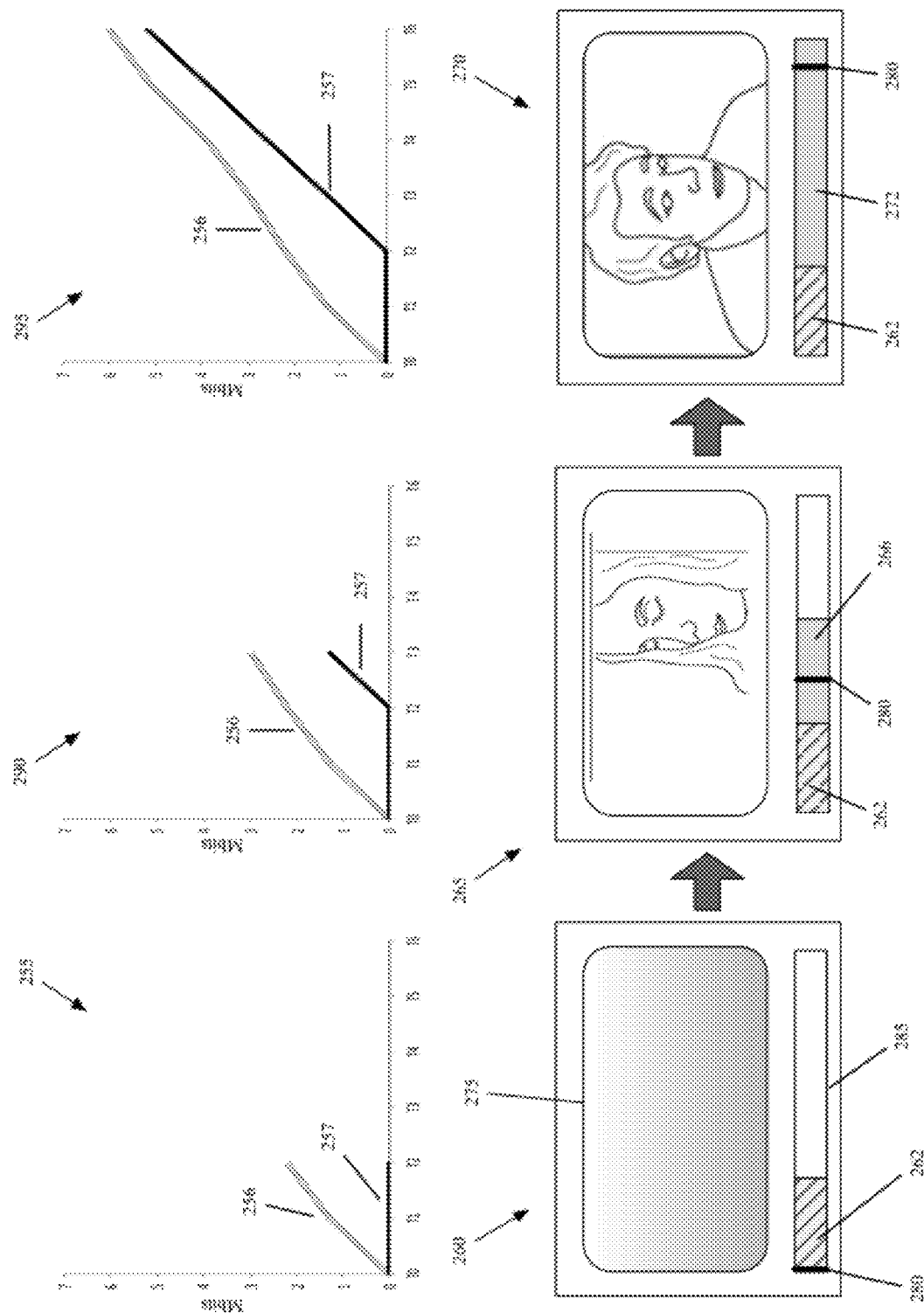

As described above, a sufficient amount of media content data needs to be buffered before the start of the playback in order to provide an uninterrupted playback of media content. FIGS. 2A-B illustrate how different amounts of media content data initially buffered can affect media content playback.

FIG. 2A illustrates a scenario in which media content data is not sufficiently buffered before the playback starts. This figure includes three line graphs 205, 240, and 245 that show the relationship between the size of downloaded media content data and the size of consumed media content data at three different stages 210, 215, and 220. In particular, these three stages reflect the state of media content playback at three different points of time T1, T3, and T4 that correspond to positions on X-axis of the line graphs 205, 240, and 245. Each of these stages will be described in detail below after an introduction of the line graphs 205, 240, and 245.

As shown in FIG. 2A, each of the line graphs 205, 240, and 245 display two lines, a download line 206 and a consumption line 207. Each point on the download line 206 illustrates the amount of media content data that has been downloaded as of that particular point in time. Similarly, each point on the consumption line 207 represents the amount of media content data that has been consumed (i.e., taken out of the buffer 140) as of that particular point in time.

During the initial buffering period from T0 to T1, the amount of downloaded media content data keeps increasing as more data is downloaded, but the amount of consumed media content data is zero. As illustrated in line graph 205, at time T1, the download line 206 has been steadily rising to indicate the amount of data buffered while the consumption line 207 stays at zero. Once the playback starts at T1, the consumption line 207 starts to rise.

These graphs are drawn under the assumption that the overall rate of data consumption is going to be higher than the downloading rate of the data. When the overall rate of data consumption is lower than the downloading rate, stalling (i.e., running out of media data to play) will not happen and initial buffering amount will be minimal. Under such assumption, the consumption line 207 always rises faster than the download line 206.

When the consumption line 207 rises fast enough to catch up with the download line 206, an interruption will occur during the playback. That is, when the data consumption is much faster than the data downloading and there is not a sufficient amount of data that is downloaded and buffered, the playback will stall. However, when a sufficient amount of media content data is initially buffered, the consumption line 207 does not catch up with the download line 206.

Line graph 240 illustrates that, at T3, the consumption line 207 is getting closer to the download line 206, but has not caught up with the download line 206 yet. As a result, the playback still has more buffered media content data to consume and there is no interruption yet.

However, in the example illustrated in FIG. 2A, the buffering period of T0-T1 is not enough. That is, not a sufficient amount of media data has been buffered at T1. As a result, the consumption line 207 rises so fast that it catches up with the download line 206 at time T4, as indicted by point 208 in line graph 245. At that point, the buffered media content data runs out and the playback stalls.

Stages 210, 215, and 220 of FIG. 2A conceptually illustrate the playback of the media content data illustrated by line graphs 205, 240, and 245. Each of the stages represents a particular point in time during the playback. Each stage shows a video playback screen 225 and a playback timeline 235. The video playback screen 225 displays the video frame currently being played back. The playback timeline 235 conceptually shows the progress of both the playback and the buffering of media content data over the entire duration of the media content. A playhead 230, depicted as a thick vertical bar in the figure, is on the timeline 235 to indicate position of the current frame being played back. The playhead 230 moves horizontally as the playback of the media content progresses in time.

The first stage 210 shows the state of playback at time T1 corresponding to line graph 205. At T1, the playback has not started yet. Accordingly, the video playback screen 225 is blank, displaying nothing. The playhead 230 is at the left most position on timeline 235. However, the downloading of media content data has been continuing for a while and a striped area 212 represents the amount of buffered media content data that is buffered during the initial buffering period between time T0 and time T1.

At the second stage 215, the playback (i.e., the consumption of media content data) has started and progressed to time T3 corresponding to line graph 240. The video playback screen 225 displays a video frame being played back at that moment. The playhead 230 has moved to a position in the middle of the timeline 235. The downloading of media content has been continuing and the gray area 216 represents media content data that has been buffered after the initial buffering period. Since the amount of buffered media content data, including buffered media content data in both the striped gray area 212 and the gray area 216, is more than the amount of media content data consumed for playback as of time T3, the playback is continuing without any problem.

The third stage 220 shows the state of playback at time T4 corresponding to line graph 245. At T4, the playhead 230 has caught up with the downloaded and buffered media data. A gray area 222 represents the media content data that has been buffered after the initial buffering period. The total amount of buffered media content data, including buffered media content data represented by the striped gray area 212 and the gray area 222, is equal to the amount of media content data that has been consumed as of that moment in time. In other words, there is no more buffered media content data to consume at time T4 and thus the playback stalls, as indicated by a sandglass 223 displayed on the video playback screen 225.

As illustrated in FIG. 2A, the playback runs out of media content data to play back because there was not enough media content data initially buffered before the playback started. To avoid running out of media content to play back, the beginning of the playback needs to be further delayed in order to have more media content data buffered before the playback starts.

FIG. 2B illustrates a scenario in which a sufficient amount of media content data for an uninterrupted playback is buffered. This figure illustrates line graphs 255, 290, and 295 that show the relationship between the size of downloaded media content data and the size of consumed media content data at three different stages 260, 265, and 270. In particular, these stages reflect the state of media content playback at three different times T2, T3, and T6 that correspond to positions on X-axis of the line graphs 255, 290, and 295.

As shown in FIG. 2B, the line graphs 255, 290, and 295 display two lines, a download line 256 and a consumption line 257. Each point on the download line 256 illustrates the amount of media content data that has been downloaded as of that particular point in time. Similarly, each point on the consumption line 257 represents the amount of media content data that has been consumed as of that particular point in time.

During the initial buffering period from T0 to T2, the amount of downloaded media content data keeps increasing, but the amount of consumed media content data is zero. As illustrated in line graph 255, the download line 256 has been steadily rising to indicate the amount of media content data buffered while the consumption line 257 stays at zero. Once the playback starts at T2, the consumption line 257 starts to rise.

Line graph 290 illustrates that the consumption line 257 is getting closer to the download line 256 as the time progresses, but has not caught up with the download line 256 yet at time T3. As a result, the playback still has more media data to play and there is no interruption.

In the example illustrated in FIG. 2B, the buffering period from T0 to T2 is enough to ensure an uninterrupted playback. That is, the amount of media content data buffered during that initial buffering period is sufficient to ensure that the playback will not run out of buffered media content data until the playback completes. As shown, the consumption line 257 rises steadily but it never catches up with the download line 256. As illustrated in line graph 295, the download line 256 indicates that the download of the requested media content data is completed at time T6 and the consumption line 257 still has not caught up with the download line 256. This means that there will be media content data to consume all the way to the end of the playback, and thus the playback never stalls.

Stages 260, 265, and 270 of FIG. 2B conceptually illustrate the playback of the media content data illustrated by line graphs 255, 290, and 295. Each of the stages represents a particular point of time during the playback. Each stage shows a video playback screen 275 and a playback timeline 285. The video playback screen 275 displays the video frame currently being played back. The playback timeline 285 conceptually shows the progress of both the playback and the buffering of media content data over the entire duration of the media content. A playhead 280 is on the timeline 285 to indicate the position of the current frame being played back. The playhead 280 moves horizontally as the playback of the media content progresses in time.

The first stage 260 shows the state of playback at time T2 corresponding to line graph 255. At T2, the playback has not yet started. The video playback screen 275 is blank. The playhead 280 is at the left most position on timeline 285. However, the downloading of media content data has been continuing for a while and a striped gray area 262 represents the amount of buffered media content data that is buffered during the initial buffering period between time T0 and time T2.

At the second stage 265, the playback (i.e., the consumption of media data) has started and progressed to time T3 corresponding to line graph 290. The video playback screen 275 displays a video frame being played back at that moment. The playhead 280 has moved to a position in the middle of the timeline 285. The downloading of media content data has been continuing. A gray area 266 represents media content data that has been buffered after the initial buffering period. Since the amount of buffered media content data, including buffered media content data in both the striped gray area 262 and the gray area 266, is more than the amount of media content data consumed for playback as of time T3, the playback is continuing without any problem.

The third stage 270 shows the state of playback at time T6 corresponding to line graph 295. At T6, the system has finished downloading the requested piece of media content. A gray area 272 represents the media content data that has been buffered after the initial buffering period. The total amount of buffered media content data, including buffered media content data in both the striped gray area 262 and the gray area 272, covers the entire timeline 285. In other words, the download of media content has completed and there will always be more data available for consumption all the way through the end of the playback.

The example in FIG. 2B illustrates that there will always be more buffered media content data than the media content data consumed by the playback process when a sufficient amount of media data is buffered during the initial buffering period. The more time the system spends doing initial buffering (i.e., the more data the system buffers before starting playback), the less likely the playback will stall. However, that also means a user has to wait for the start of the playback for a longer period of time. An accurate estimation of bandwidth will help to determine an optimal amount of media content data for initial buffering to ensure an uninterrupted playback while keeping the initial waiting or delay as short as possible.

II. Bandwidth Estimation

Section I above described the importance of having a sufficient initial buffering of media content data in providing an uninterrupted playback of the media content. As discussed above, the key for having an optimum result (i.e., an uninterrupted playback with a minimum initial delay) is to have an accurate estimation of the bandwidth. Based on an accurate bandwidth estimate, some embodiments determine the amount of initial buffering to ensure that the user will not experience any stall during the playback of the media content while keeping the initial waiting as short as possible.

Figure 3:
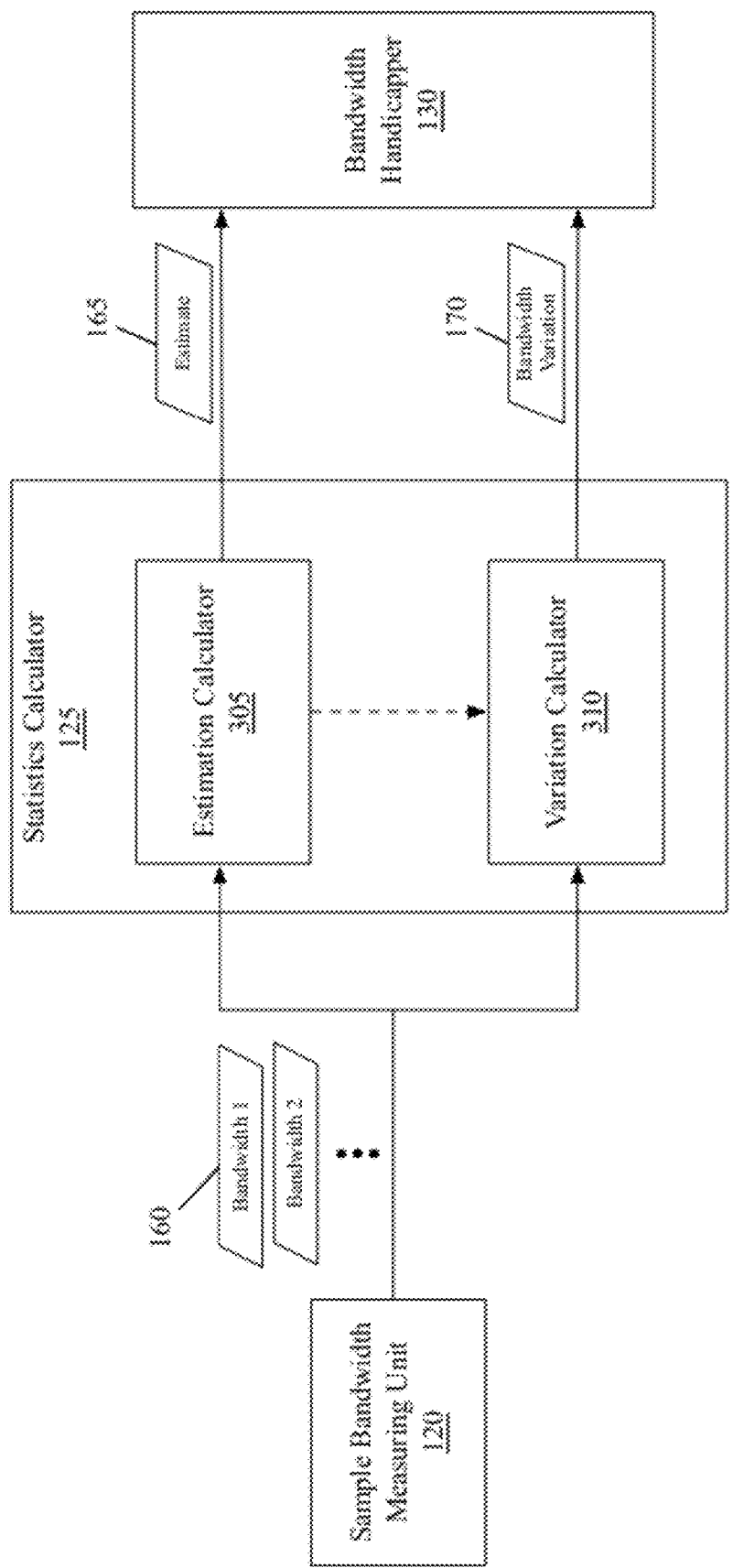
FIG. 3 conceptually illustrates computing a set of statistical measures based on sample instantaneous bandwidth measurements.

FIG. 3 conceptually illustrates computing a set of statistical measures based on sample instantaneous bandwidth measurements. Specifically, this figure provides more details of the statistics calculator 125 described above by reference to FIG. 1.

As described above, the statistics calculator 125 receives several instantaneous bandwidth measurements 160 from the sample bandwidth measuring unit 120 that computes those instantaneous bandwidth measurements. The details of calculating instantaneous bandwidth measurements will be discussed further below by reference to FIG. 7 and FIG. 8A-B. The statistics calculator 125 calculates the bandwidth estimate 165 and the bandwidth variation 170, and then sends them to the bandwidth handicapper 130 to compute a revised bandwidth estimate. As shown in FIG. 3, the statistics calculator 125 of some embodiments includes an estimation calculator 305 and a variation calculator 310.

In some embodiments, the estimation calculator 305 receives the instantaneous bandwidth measurements 160 and computes the bandwidth estimate 165 based on the bandwidth measurements 160. The bandwidth estimate 165 that the estimation calculator computes in some embodiments is the average (arithmetic mean) of all instantaneous bandwidth measurements 160.

Below is an example formula that estimation calculator 305 uses to compute the average:

$$AM = \frac{1}{n}\sum_{i=1}^{n} a_i.$$

If n numbers are given and each number is denoted by $a_i$, where i=1, . . . , n, the arithmetic mean is the sum of the $a_i$'s divided by n. In some embodiments, the bandwidth estimate 165 that the estimation calculator 305 computes is the median of all instantaneous bandwidth measurements 160, or some other statistical measures.

The variation calculator 310 receives the instantaneous bandwidth measurements 160 and computes the bandwidth variation 170 based on the instantaneous bandwidth measurements 160. The bandwidth variation 170 that the variation calculator 310 computes is a statistical measure that quantifies the degree of fluctuation of the underlying network connection. For instance, the bandwidth variation 170 is a standard deviation of all instantaneous bandwidth measurements 160.

Standard deviation is a measurement of variability or diversity of data points. It shows how much variation or dispersion from the average (a mean, or an expected value, etc.) of the data points exists. A low standard deviation indicates that the data points tend to be very close to the average, while high standard deviation indicates that the data points are spread out over a large range of values.

The standard deviation of a statistical population, data set, or probability distribution is the square root of its variance. One can find the standard deviation of an entire population in cases where every member of a population is sampled. When only a portion of the entire population is available, the standard deviation for the population can be estimated by a modified quantity called the sample standard deviation, which is denoted by $S_N$ and is defined as follows:

$$S_N = \sqrt{\frac{1}{N}\sum_{i=1}^{N}(x_i - \bar{x})^2}.$$

where $\{x_1, x_2, \ldots, x_N\}$ are the observed values of the sample items and $\bar{x}$ is the mean value of these observations. In some embodiments, the bandwidth variation 170 that the variation calculator 310 computes could be variance, range, interquartile range, average absolute deviation, coefficient of variation, or some other statistical measures.

In some embodiments, the estimation calculator 305 sends the bandwidth estimate to the variation calculator 310 for calculating the bandwidth variation 170. For example, the estimation calculator 305 may send the average bandwidth of the instantaneous bandwidth measurements to the variation calculator 310 for the computation of standard deviation.

In operation, the statistics calculator 125 receives several instantaneous bandwidth measurements 160 that the receiving device 100 obtained at several different instances of time. The statistics calculator 125 computes the bandwidth estimate 165 using the estimation calculator 305 and computes the bandwidth variation 170 using the variation calculator 310, then sends the results to the bandwidth handicapper 130 to compute the revised bandwidth estimate.

Figure 4:
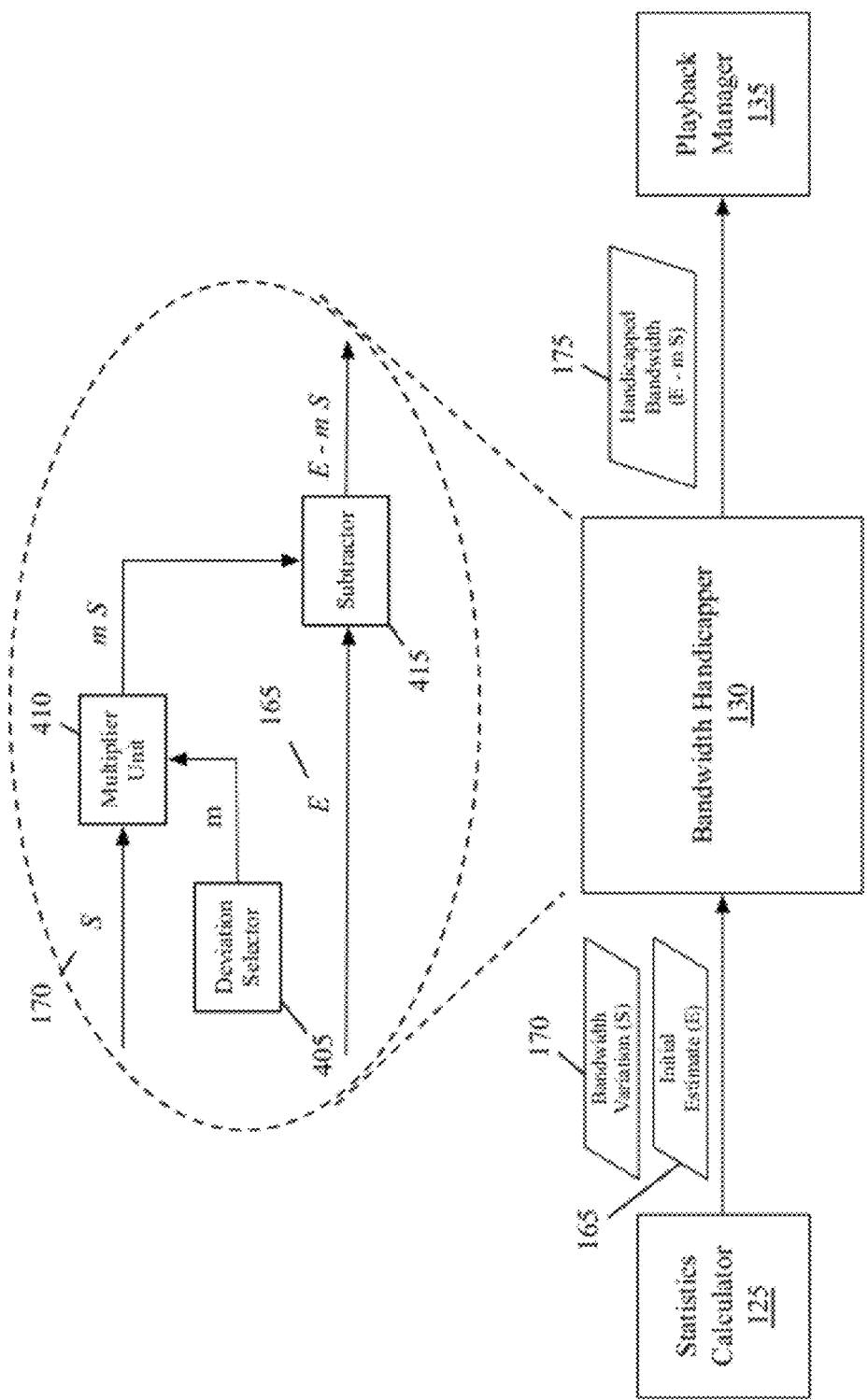
FIG. 4 conceptually illustrates computing a revised bandwidth estimate by handicapping an initial bandwidth estimate based on bandwidth variation.

FIG. 4 conceptually illustrates computing a revised bandwidth estimate by handicapping a bandwidth estimate based on a bandwidth variation. Specifically, this figure provides more details of the bandwidth handicapper 130 described above by reference to FIG. 1.

The bandwidth handicapper 130 receives the bandwidth estimate 165 and the bandwidth variation 170 from the statistics calculator 125 described above by reference to FIG. 3. The bandwidth handicapper 130 handicaps the bandwidth estimate 165 with the bandwidth variation 170, and then sends the handicapped bandwidth 175 as the revised bandwidth estimate to the playback manager 135. As shown in FIG. 4, the bandwidth handicapper 130 of some embodiments includes a deviation selector 405, a multiplier unit 410, and a subtractor 415. The bandwidth handicapper 130 in some embodiments may use different statistical measures than the standard deviation, such as variance, range, interquartile range, average absolute deviation, and coefficient of variation.

The deviation selector 405 selects a multiplier, m, for standard deviation. The deviation selector then sends the selected multiplier for standard deviation to the multiplier unit 410. Usually, one standard deviation, i.e., m=1, is suitable for handicapping because bandwidths within one standard deviation of the mean bandwidth cover about 68.2% of a possible bandwidth fluctuation range according to the normal distribution. However, the deviation selector 405 selects two standard deviations, i.e., m=2, when taking a more conservative approach to reduce the chance of any possible stalling. Bandwidths within two standard deviations of the mean would cover about 95.4% of a possible bandwidth fluctuation range according to the normal distribution. The bigger fluctuation range is covered, the less likely the bandwidth at any moment during the playback will fall out of the estimation.

The multiplier unit 410 in some embodiments receives two inputs. One is the standard deviation (S) 170 from the statistics calculator 125 and the other is the multiplier, m, for standard deviation selected by the deviation selector 405. The multiplier unit 410 multiplies S170 by m and sends the result mS to the subtractor 415.

The subtractor 415 receives the bandwidth estimate (E) 165 from the statistics calculator 125 and mS from the multiplier unit 410. The subtractor 415 subtracts mS from E and sends the resulting E−mS as the handicapped bandwidth 175 to the playback manager 135.

An example operation of the bandwidth handicapper 130 will now be described. The statistics calculator 125 sends the bandwidth estimate 165, E, and the bandwidth variation 170, S, to the bandwidth handicapper 130. In this example, E is 2 Mbit/s and S is 0.5. In some embodiments, the bandwidth estimate 165 is an average of the instantaneous bandwidth measurements 160 and the bandwidth variation 170 is the standard deviation of the instantaneous bandwidth measurements 160.

The deviation selector 405 selects a multiplier m for the standard deviation. Most of the times, m is set to 1, which means one standard deviation is selected. However, two standard deviations (i.e., m is set to 2) are selected sometimes when adopting a more conservative approach. In this example, the selected multiplier is 1, which makes m equal to 1.

The multiplier unit 410 receives the standard deviation 170, 0.5 Mbit/s, from the statistics calculator 125 and multiplies it with the selected multiplier 1. The resulting mS is then $$1 \times 0.5 = 0.5 \text{ Mbit/s.}$$

The subtractor 415 receives the initial bandwidth estimate, 2 Mbit/s, from the statistics calculator 125 and subtracts mS, 0.5 Mbit/s. The result is $$2 \text{ Mbit/s} - 0.5 \text{ Mbit/s} = 1.5 \text{ Mbit/s.}$$

The subtractor 415 sends the result of E−mS, which is 1.5 Mbit/s, to the playback manager 135 as the handicapped bandwidth 175. When one standard deviation is selected, the handicapped bandwidth 175 for this example is 1.5 Mbit/s as described above. When two standard deviations are selected, the handicapped bandwidth 175 is $$E-2S=2.0 \text{ Mbit/s} - 2 \times 0.5 \text{ Mbit/s} = 1.0 \text{ Mbit/s.}$$

FIG. 4 illustrates that the bandwidth handicapper 130 in some embodiments computes a revised bandwidth estimate by subtracting a multiple of standard deviation from a bandwidth estimate. However, other embodiments compute the revised bandwidth estimate differently. For instance, the bandwidth handicapper 130 in some embodiments calculates a multiplier based on the bandwidth variation, and then multiplies the initial bandwidth estimate by the calculated multiplier. Other embodiments may use different combinations of different mathematical computations to revise the bandwidth estimate.

Figure 5:
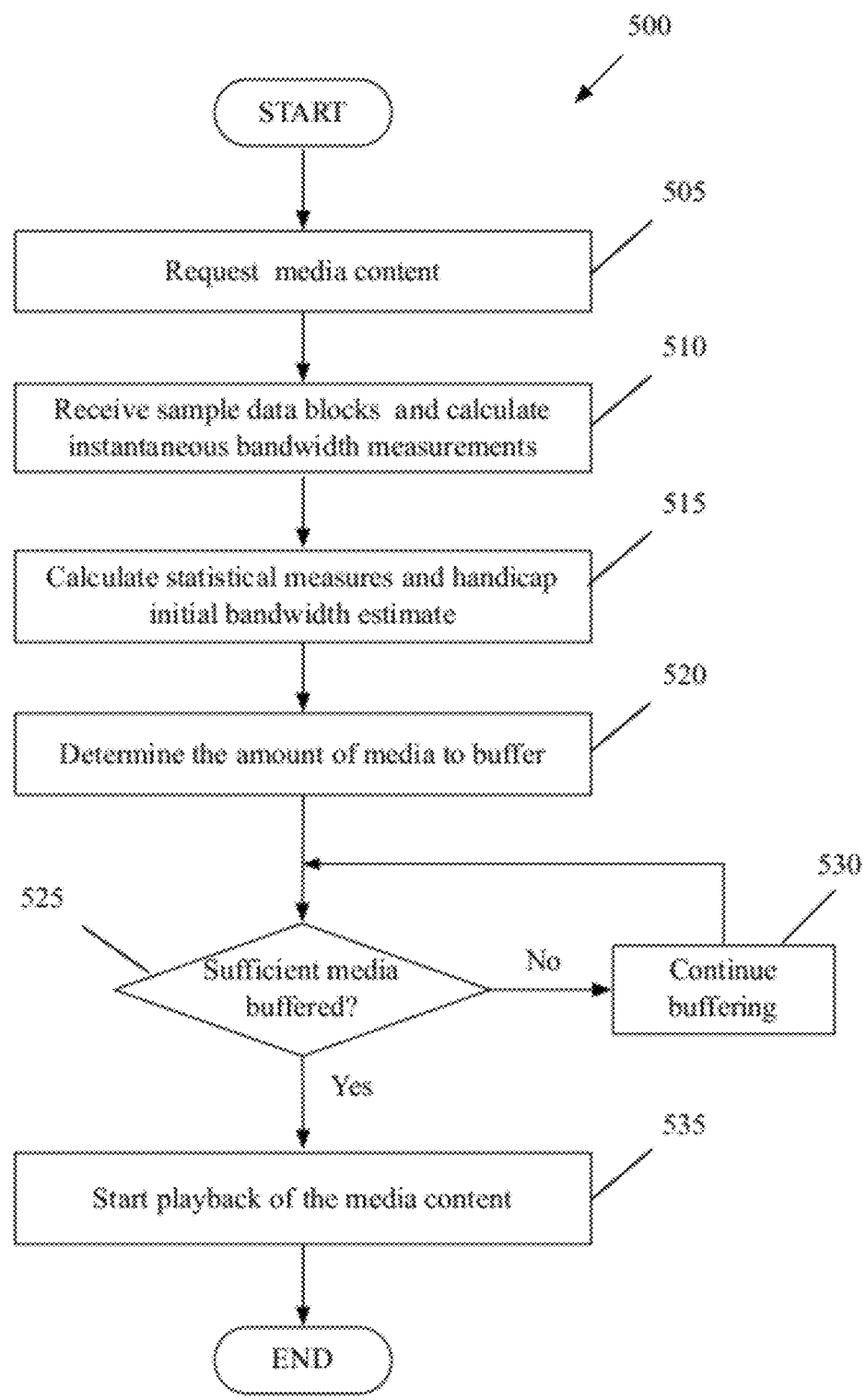
FIG. 5 conceptually illustrates a process performed by a receiving device in some embodiments to acquire and playback a piece of media content without any interruption.

FIG. 5 conceptually illustrates a process 500 performed by some embodiments to acquire and play back a piece of media content without any interruption. In some embodiments, a receiving device such as the receiving device 100 described above by reference to FIG. 1 performs the process. More specifically, one or more software applications that are executing on this receiving device perform the process in some embodiments. Process 500 in some embodiments starts when the receiving device establishes a network connection with a content server.

The process begins by requesting (at 505) for a piece of media content from a content server. Once the content server receives the request and approves it, the content server converts the requested piece of media content into a bit stream and sends the bit stream to the receiving device.

Process 500 then receives (at 510) several sample data blocks in the bit stream and calculates instantaneous bandwidth measurements based on the received sample data blocks. These sample data blocks are part of the media content data being received by the receiving device. In some embodiments, the process processes these sample data blocks in groups in order to lessen the effects of the fluctuations caused by a low level buffering mechanism (e.g., a network interface card's mechanism that accumulates the received data before sending up the data to the application(s) in batches). The details of processing sample data blocks and calculating instantaneous bandwidth measurements will be discussed further below by reference to FIG. 7 and FIG. 8A-B.

The process then proceeds to 515 to calculate statistical measures and handicap an initial bandwidth estimate based on those calculated statistical measures. Those statistical measures quantify the degree of fluctuation of the bandwidth of the underlying network connection during the time period that the statistics are measured. The details of this operation 515 will be further described below by reference to FIG. 6.

Based on the revised bandwidth estimate and the rate of media content data consumption by the playback, the process determines (at 520) the minimum amount of media content data to buffer in order to provide an uninterrupted playback. The amount of media content data to buffer is denoted by $D_{buf}$ and is defined as follows:

$$D_{buf}=(S_{pb}-S_d) \times T_{pb},$$

where $S_{pb}$ is the speed of playback (i.e., the media content data consumption rate), $S_d$ is the speed of media data download, and $T_{pb}$ is the total time of the playback. The length of the initial buffering period is denoted by $T_{buf}$ and is defined as follows:

$$T_{buf}=D_{buf} \div S_d.$$

An example of determining the minimum amount of media content data to buffer for an uninterrupted playback will now be described. The receiving device downloads media content data at 1 Mbit/s. The receiving device consumes the downloaded media content data at 1.2 Mbit/s during playback of the media content. And the total playback time is 100 seconds. The amount of media content data needs to be initially buffered would be:

(1.2 Mbit/s−1 Mbit/s)×100 s=20 Mbit.

It follows that the length of the initial buffering period would be:

20 Mbit÷1 Mbit/s=20 s.

In other words, the playback needs to be delayed for 20 seconds in order to have enough buffered media content data to provide an uninterrupted playback experience to a user.

Process 500 then determines (at 525) whether a sufficient amount of media content data for an uninterrupted playback of the media content has been buffered. When process 500 determines (at 525) that the amount of media content data that has been buffered is not sufficient yet, the process proceeds to 530 to continue downloading and buffering media content data. The process then loops back to 524 to determine (at 525) whether a sufficient amount of media content data has been buffered.

When process 500 determines (at 525) that the process has buffered enough media content data for an uninterrupted playback of the media content, the process starts (at 535) playback of the media content.

Figure 6:
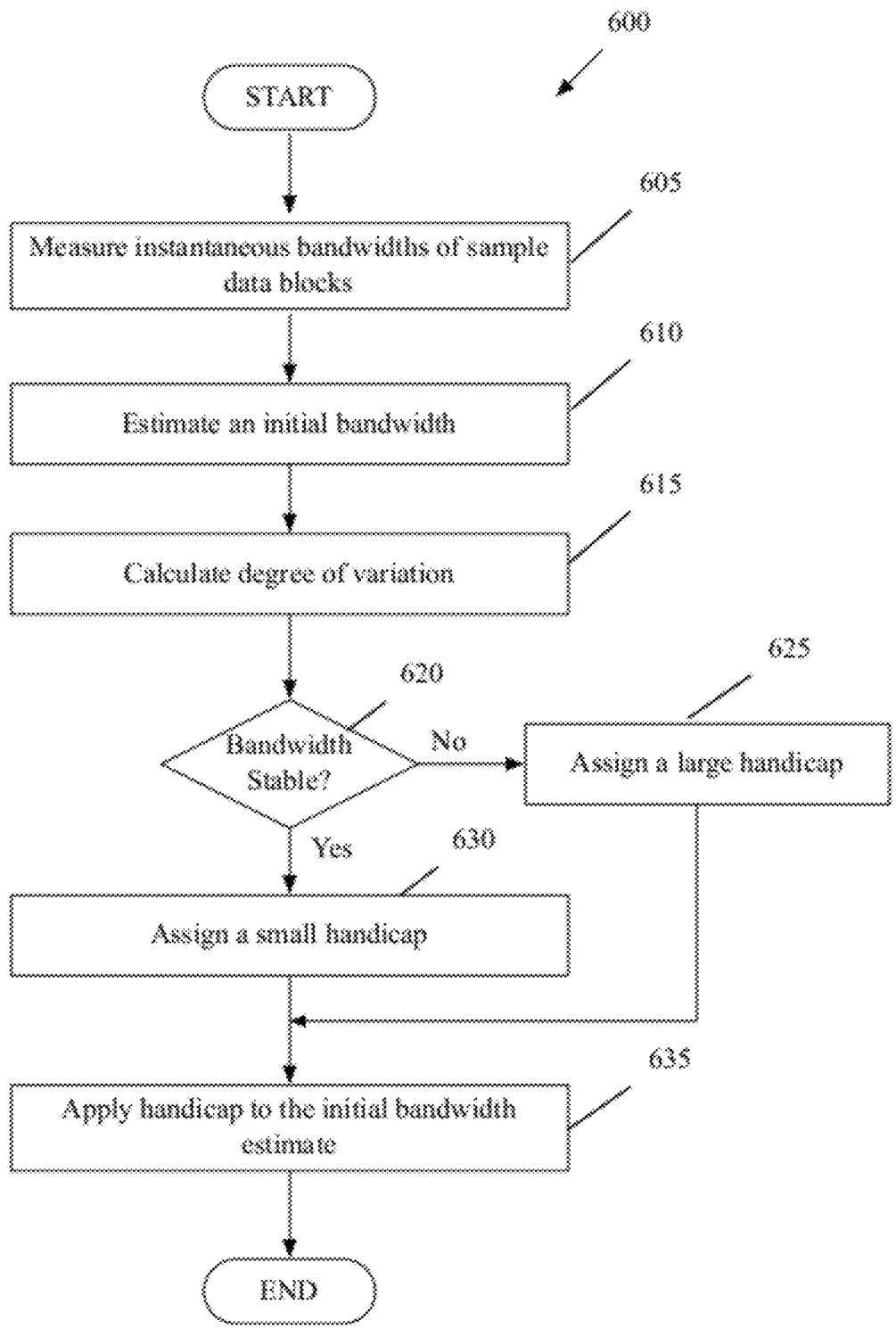
FIG. 6 conceptually illustrates a process performed by a receiving device in order to compute a revised bandwidth estimate.

FIG. 6 conceptually illustrates the process 600 performed by some embodiments to compute a revised bandwidth estimate. In some embodiments, the process provides more details of the operation 515 described above by reference to FIG. 5. Process 600 calculates a set of statistical measures and handicaps a bandwidth estimate based on the calculated set of statistical measures. A receiving device such as the receiving device 100 described above by reference to FIG. 1 performs the process in some embodiments. The process 600 in some embodiments starts when the receiving device receives several sample data blocks of media content from a content server.

The process begins by measuring (at 605) instantaneous bandwidths of the sample data blocks. As described above, the instantaneous bandwidth measurements provide the receiving device with the current condition (e.g., bandwidth) of the underlying network connection. Computing instantaneous bandwidths will be described further below by reference to FIG. 7 and FIGS. 8A-B.

The process 600 then estimates (at 610) a bandwidth based on those instantaneous bandwidth measurements of sample data blocks. In some embodiments, the process 600 calculates the bandwidth estimate by taking an arithmetic mean of those instantaneous bandwidth measurements. In some other embodiments, the process calculates other statistical measures (e.g., a median of the instantaneous bandwidth measurements) to use as the bandwidth estimate.

The process 600 then calculates (at 615) a degree of variation among the instantaneous bandwidth measurements of sample data blocks. In some embodiments, the process 600 calculates a standard deviation to quantify the degree of variation. In other embodiments, the process computes other statistical measures, such as range and coefficient of variation, to quantify the degree of variation.

It should also be noted that the process's calculation of the degree of variation at 615 is dependent on the bandwidth estimate calculated at 610 in some embodiments, while the bandwidth estimate is not a factor in calculating the degree of variation in other embodiments. For instance, in some embodiments, the calculation of standard deviation depends on the calculation of arithmetic mean because the process needs the arithmetic mean of the instantaneous bandwidth measurements in order to calculate the standard deviation of the instantaneous bandwidth measurements. In those embodiments where the bandwidth estimate is not a factor in calculating the degree of variation, the process may perform operations 610 and 615 in parallel.

Process 600 then determines (at 620) whether the bandwidth is stable, i.e., whether the bandwidth has a small variation among those instantaneous bandwidth measurements of sample data blocks. In some embodiments, the process determines the stableness of the bandwidth using the calculated degree of variation. For instance, when the computed degree of variation is greater than a certain value in a certain unit, the process determines that the bandwidth is not stable.

When process 600 determines (at 620) that the bandwidth of underlying network connection is stable, the process assigns (at 630) a small handicap value. Otherwise, the process assigns (at 625) a large handicap value.

In some embodiments, the process calculates standard deviation of the instantaneous bandwidth measurements to quantify the degree of variation of the network connection. In some such embodiments, process 600 directly assigns a multiple of the standard deviation as the handicap value because the standard deviation is large when the bandwidth is fluctuating and the standard deviation is small when the bandwidth is stable.

Finally, process 600 applies (at 635) the handicap value to the bandwidth estimate calculated at 601. Different embodiments apply the handicap value differently. For instance, the process in some embodiments subtracts the handicap value from the bandwidth estimate. In other embodiments, the process first calculates a multiplication factor based on the handicap value, and then multiplies the bandwidth estimate by the multiplication factor. Other embodiments may use different combinations of different mathematical computations to apply the handicap value. The resulting value is the revised bandwidth estimate.

The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. For instance, during a communication session, the process 600 may repeat the operations 605-635 periodically in order to refine the revised bandwidth estimate.

III. Sample Instantaneous Bandwidth Measurements

Figure 7:
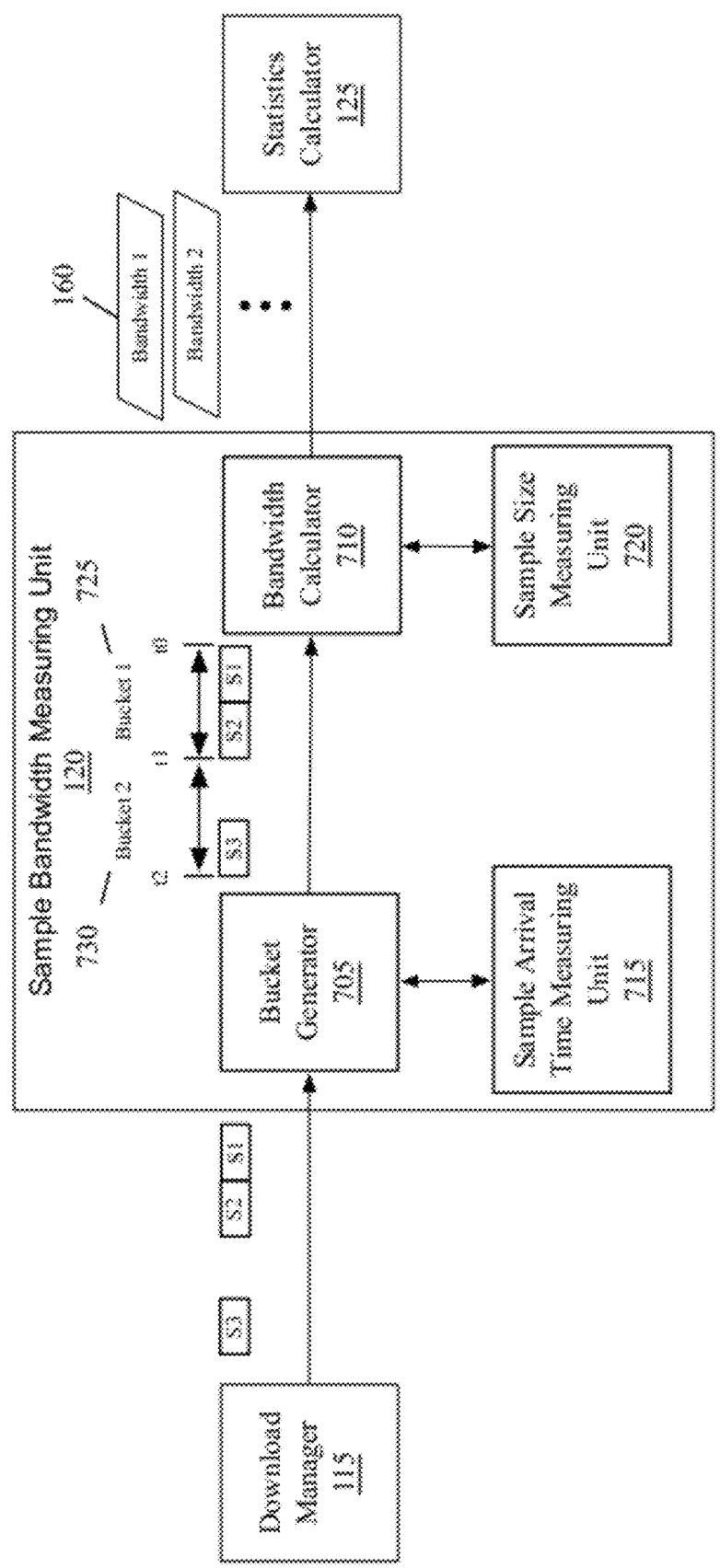
FIG. 7 conceptually illustrates computing several instantaneous bandwidth measurements based on sample data blocks.

As described above, in order to calculate a set of statistical measures to use when computing a revised bandwidth estimate, the receiving device of some embodiments first calculates sample instantaneous bandwidth measurements at several different instances of time. FIG. 7 conceptually illustrates computing several instantaneous bandwidth measurements based on sample data blocks. Specifically, this figure illustrates the manner in which some embodiments coalesce sample data blocks into data buckets at a particular time interval to lessen the effects of the bandwidth fluctuations caused by lower level buffering mechanism on calculation of the real bandwidth fluctuation. Each data bucket is a data unit that includes all sample data blocks within one particular time interval.

The sample bandwidth measuring unit 120 receives several sample data blocks, e.g., s1-s3, from the download manager 115. The sample bandwidth measuring unit 120 then computes several instantaneous bandwidth measurements 160 and sends the measurements to the statistics calculator 125. As shown in FIG. 7, the sample bandwidth measuring unit 120 of some embodiments includes a bucket generator 705, a bandwidth calculator 710, a sample arrival time measuring unit 715, and a sample size measuring unit 720.

In some embodiments, the download manager 115 sends several sample incoming data blocks to the sample bandwidth measuring unit 120. Because of the way low level buffering mechanism (e.g., performed by a network interface card which sends the sample data blocks to the download manger 115 in batches) handles incoming data, these data blocks sometimes come to the sample bandwidth measuring unit 120 as huge blocks of data during some time periods. At other times, there is very little data coming to the sample bandwidth measuring unit 120. As a result, the data sent to the sample bandwidth measuring unit 120 using the low level buffering mechanism do not necessarily reflect how fast the data actually arrives or how fluctuating the bandwidth of the network connection actually is.

In order to compensate for this bursting effect caused by the low level buffering mechanism, the bucket generator 705 coalesces the incoming data blocks (e.g., s1-s3) into data buckets (e.g., bucket 1 and bucket 2 in FIG. 7) at a particular time interval. The compensation for the bursting effect will be described in detail further below by reference to FIGS. 8A and 8B. The bucket 1 contains all the data received between times t0 and t1. The bucket 2 contains all the data received between times t1 and t2. The time interval between t0 and t1 and the time interval between t1 and t2 have the same temporal length. In some embodiments, the bucket generator 705 uses the sample arrival time measuring unit 715 to measure the arrival time of each incoming data block.

The bandwidth calculator 710 receives data buckets, e.g., bucket 1 and bucket 2 from the bucket generator 705. In some embodiments, the bandwidth calculator 710 uses the sample size measuring unit 720 to measure the amount of data in each bucket. Based on the amount of data in each bucket and the time interval of each bucket, the bandwidth calculator 710 calculates an instantaneous bandwidth for each bucket of data. The sample bandwidth measuring unit 120 sends the computed instantaneous bandwidth measurements 160 to the statistics calculator 125.

Figure 8:
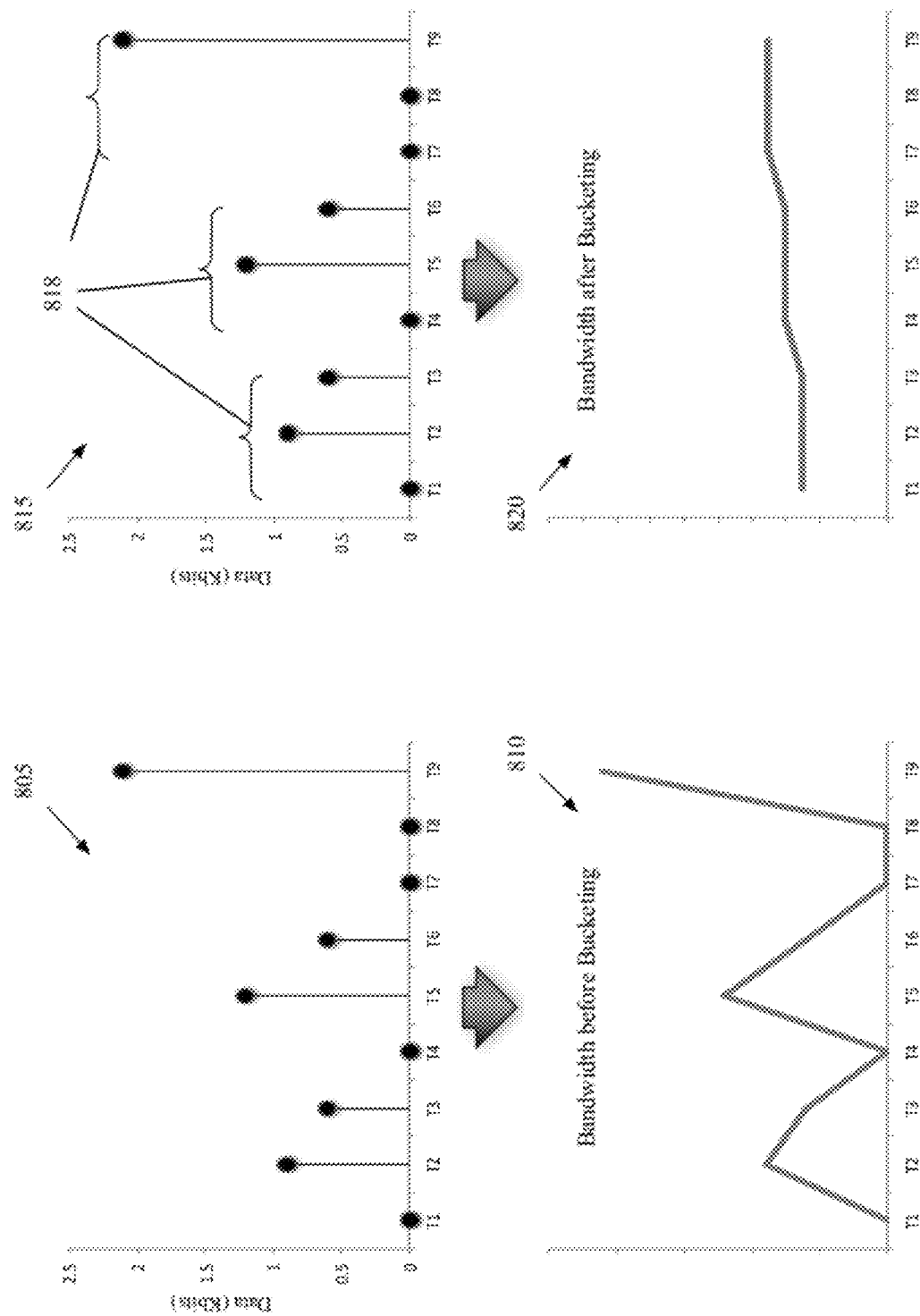
FIGS. 8A-B illustrate the effect of data bucketing on calculating instantaneous bandwidth measurements.

FIGS. 8A and 8B illustrate the effect of data bucketing on instantaneous bandwidth measurements. Specifically, FIG. 8A shows the instantaneous bandwidth measurements without bucketing and FIG. 8B shows the instantaneous bandwidth measurements with bucketing.

FIG. 8A includes a scatter chart 805 and a line graph 810. The scatter chart 805 shows the amount of data received at each time period from T1 to T9. As illustrated in this figure, during some time periods (e.g., T4-T5 and T8-T9), a relatively large amount of data was received. However, at some other points in time (e.g., T0-T1, T3-T4, T6-T7, and T7-T8), no data was received. When instantaneous bandwidth measurements are calculated based on these raw data blocks for each time period as shown by the line graph 810, the instantaneous bandwidth measurements fluctuate wildly. As described above, such wild bandwidth fluctuations are caused by low level buffering mechanism of the receiving device and thus may not truly reflect bandwidth variation of the underlying network connection. In order to lessen the effects of the bandwidth fluctuations caused by low level buffering mechanism on the calculation of bandwidth variation, the receiving device of some embodiments groups the sample data blocks into buckets. FIG. 8B below conceptually illustrate the effect of bucketing sample data blocks.

FIG. 8B includes a scatter chart 815 and a line graph 820. The scatter chart 815 is similar to the scatter chart 805 in FIG. 8A. The chart shows the amount of data received at each time period from 0 to T9. However, in the scatter chart 815, the nine time periods from 0 to T9 are divided into three buckets 818, each of which contains three time periods. In other words, a bucket is generated at an interval of three units of time. All data in each bucket is aggregated together in calculating bandwidth for the bucket. For instance, the sizes of data received from time 0 to time T3 are added together, and then divided by the three units of time, to get an instantaneous bandwidth for the three time periods, 0-T1, T-T2, and T2-T3.

As shown in the line graph 820, the resulting instantaneous bandwidth measurements do not vary over the time as much as the bandwidth measurements do as shown by the line graph 810. The bursting effect caused by low level buffering mechanism has been compensated. These instantaneous bandwidth measurements better reflects the true bandwidth fluctuation of the underlying network connection.

FIG. 7 and FIGS. 8A-B provide an example of calculating a pool of sample instantaneous bandwidth measurements. However, irrespective of the example described above, one of ordinary skill in the art will realize that some embodiments of the invention might use other methods to calculate the pool of sample instantaneous bandwidth measurements. For instance, instead of calculating sample instantaneous bandwidth measurements at a particular time interval, the method some embodiments may calculate a sample instantaneous bandwidth measurement for every set of packets received at the receiving device. That is, the method in these embodiments calculates an instantaneous bandwidth measurement for every certain number of packets it receives, instead of calculating it for every certain time period.

IV. Applications

Figure 9:
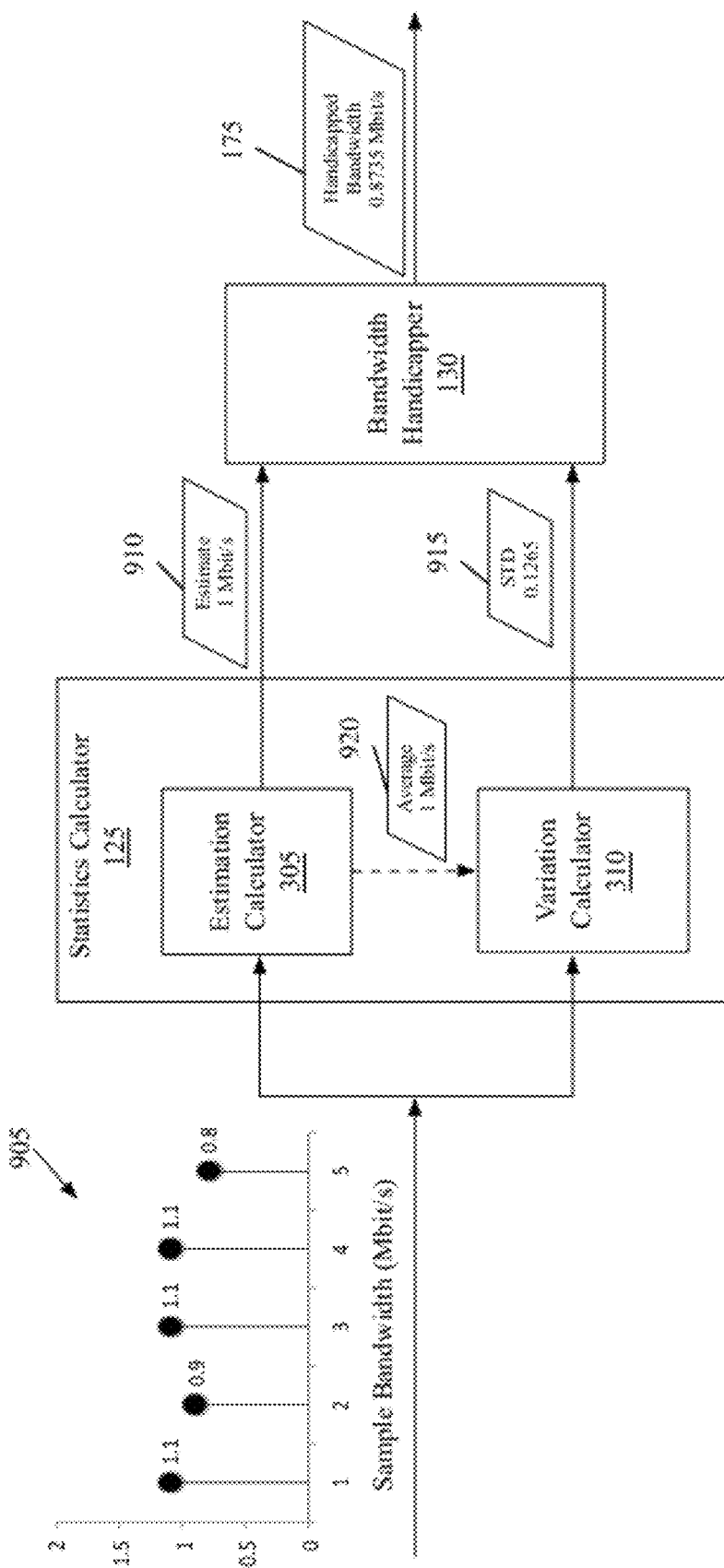
FIG. 9 illustrates an example of estimating bandwidth based on a pool of sample instantaneous bandwidth measurements that have little fluctuation.
Figure 10:
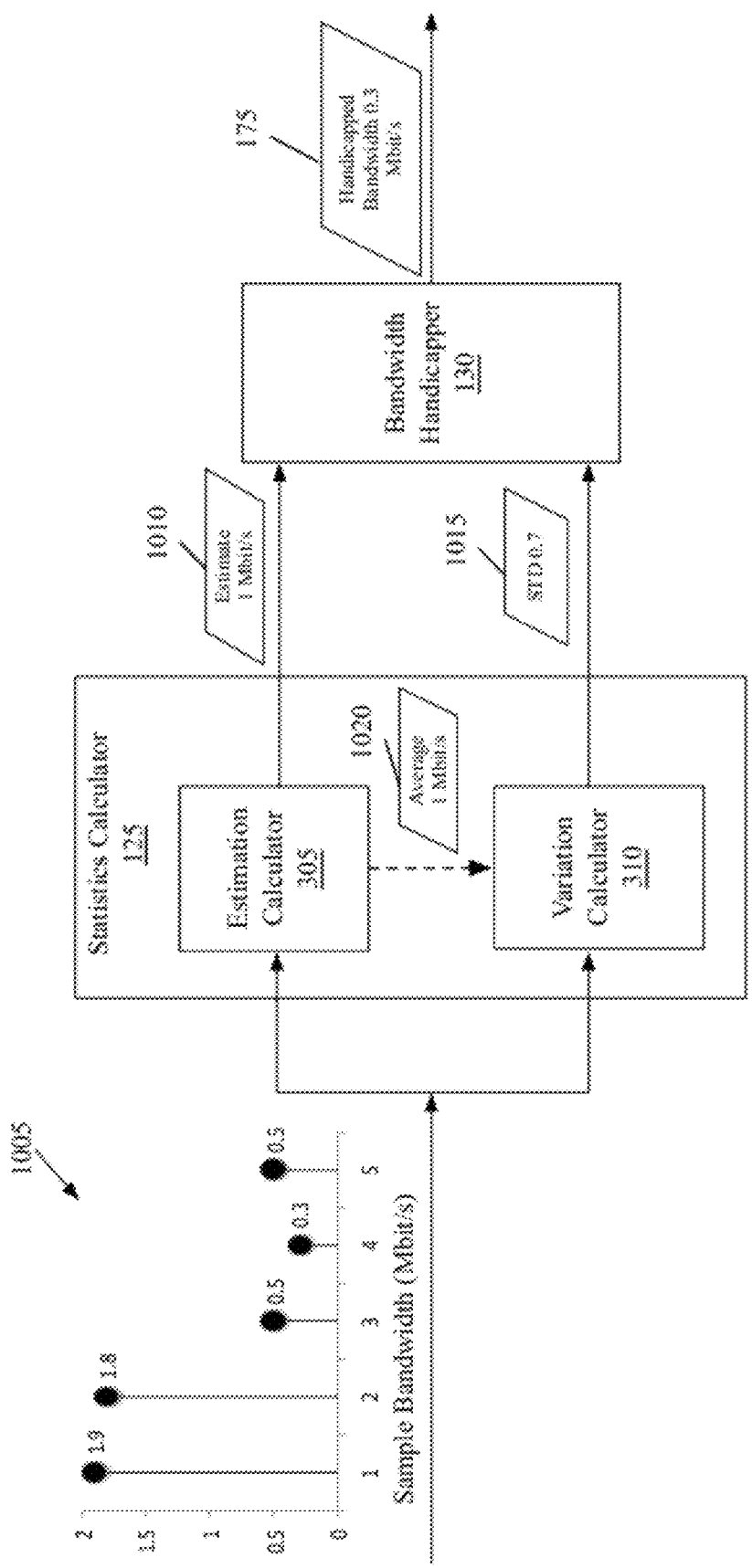
FIG. 10 illustrates an example of estimating bandwidth based on a pool of sample instantaneous bandwidth measurements that have large fluctuation.

FIG. 9 and FIG. 10 illustrate two examples of estimating bandwidth based on statistical measures that quantify bandwidth variation. One example shows instantaneous bandwidth measurements with little fluctuation and how it affects the revised bandwidth estimate. Another example shows instantaneous bandwidth measurements with huge fluctuation and how it affects the revised bandwidth estimate.

FIG. 9 illustrates an example of estimating bandwidth based on a pool of sample instantaneous bandwidth measurements that have little fluctuation. Specifically, this figure illustrates the statistics calculator 125 described above by reference to FIGS. 1 and 3 and the bandwidth handicapper 130 described above by reference to FIGS. 1 and 4.

As described above, the statistics calculator 125 receives a pool of instantaneous bandwidth measurements 905 and computes an initial bandwidth estimate 910 and a standard deviation 915 based on the pool. The statistics calculator 125 then sends them to the bandwidth handicapper 130 which computes a revised bandwidth estimate. As shown in FIG. 9, the statistics calculator 125 of some embodiments includes the estimation calculator 305 and the variation calculator 310, both of which are described above by reference to FIG. 3.

In some embodiments, the estimation calculator 305 receives the pool of instantaneous bandwidth measurements 905 and computes the initial bandwidth estimate 910, which could be the average (arithmetic mean) of the pool of instantaneous bandwidth measurements 905. In this particular example, the statistics calculator 125 receives five instantaneous bandwidth measurements with small fluctuation. The measurements are 1.1 Mbit/s, 0.9 Mbit/s, 1.1 Mbit/s, 1.1 Mbit/s, and 0.8 Mbit/s as shown. The arithmetic mean of these five instantaneous bandwidth measurements is the sum of the five measurements divided by five, which is $$\frac{1.1 \text{ Mbit/s} + 0.9 \text{ Mbit/s} + 1.1 \text{ Mbit/s} + 1.1 \text{ Mbit/s} + 0.8 \text{ Mbit/s}}{5} = 1 \text{ Mbit/s}.$$

In some embodiments, the initial bandwidth estimate 910 that the estimation calculator 305 computes is the median of the pool of instantaneous bandwidth measurements 905, or some other statistical measure.

The variation calculator 310 receives the pool of instantaneous bandwidth measurements 905. The variation calculator 310 in some embodiments receives the arithmetic mean 920 from the estimation calculator 305 when necessary. The variation calculator 310 then computes the standard deviation 915 of the instantaneous bandwidth measurements. The standard deviation 915 quantifies the degree of fluctuation of the underlying network connection.

The standard deviation of a statistical population, data set, or probability distribution as mentioned above, is the square root of its variance. The standard deviation 915 is calculated as follows:

$$\sqrt{\frac{(1.1-1)^2 + (0.9-1)^2 + (1.1-1)^2 + (1.1-1)^2 + (0.8-1)^2}{5}} \text{ Mbit/s} =$$

0.1265 Mbit/s.

In some other embodiments, instead of computing the standard deviation, the variation calculator 310 computes variance, range, interquartile range, average absolute deviation, coefficient of variation, or some other statistical measures that quantify variation of the instantaneous bandwidth measurements. In some such embodiments, the estimation calculator 305 does not send the initial bandwidth estimate to the variation calculator 310 because the variation calculator may not need the initial bandwidth estimate when the bandwidth variation that the variation calculator calculates is a statistical measure that does not require the initial bandwidth estimate to compute.

The statistics calculator 125 receives the pool of instantaneous bandwidth measurements 905. Then, the statistics calculator 125 uses the estimation calculator 305 to compute the initial bandwidth estimate 910. The statistics calculator 125 uses the variation calculator 310 to compute standard deviation 915. The statistics calculator sends the initial bandwidth estimate 910 and the standard deviation 915 to the bandwidth handicapper 130.

The bandwidth handicapper 130 receives the initial bandwidth estimate 910 and the standard deviation 915 from the statistics calculator 125. The bandwidth handicapper 130 handicaps the initial bandwidth estimate 910 by the standard deviation 915, and then sends out the handicapped bandwidth 175 as the revised bandwidth estimate. The bandwidth handicapper 130 may use different statistical measures, such as variance, range, interquartile range, average absolute deviation, and coefficient of variation calculated by the variation calculator 310, to do handicapping in different embodiments.

In this example, the bandwidth handicapper 130 handicaps the initial bandwidth estimate 910 by one standard deviation 915. That is, the bandwidth handicapper 130 reduces the initial bandwidth estimate 910 by one standard deviation 915. The resulting handicapped bandwidth 175 is:

1 Mbit/s−0.1265 Mbit/s=0.8735 Mbit/s.

In some embodiments, the bandwidth handicapper handicaps the initial bandwidth estimate 910 by more than one standard deviation (e.g., by two standard deviations to adopt a more conservative approach).

Since the fluctuation of instantaneous bandwidth measurements 905 is small as shown, the bandwidth handicapper 130 assumes that the bandwidth is going to remain close to the initial bandwidth estimate 910 in the near future. Handicapping the initial bandwidth estimate 910 with the standard deviation 915 should create a margin of safety even though the value of standard deviation 915 is small. When the handicapped bandwidth 175 is used to determine the amount of media content data for initial buffering in media content playback, it is likely to ensure an uninterrupted playback.

FIG. 10 illustrates an example of estimating bandwidth based on a pool of sample instantaneous bandwidth measurements that have large fluctuation. Specifically, this figure illustrates the statistics calculator 125 described above by reference to FIGS. 1, 3, and 9 and the bandwidth handicapper 130 described above by reference to FIGS. 1 and 4.

In this example, the statistics calculator 125 receives a pool of instantaneous bandwidth measurements 1005 and computes an initial bandwidth estimate 1010 and a standard deviation 1015 based on the pool. The statistics calculator 124 then sends them to the bandwidth handicapper 130, which computes a revised bandwidth estimate. As shown in FIG. 10, the statistics calculator 125 of some embodiments includes the estimation calculator 305 and the variation calculator 310, both of which are described above by reference to FIG. 3.

In some embodiments, the estimation calculator 305 receives the pool of instantaneous bandwidth measurements 1005 and computes the initial bandwidth estimate 1010, which could be the average (arithmetic mean) of the pool of instantaneous bandwidth measurements 1005. In this particular example, the statistics calculator 125 receives five instantaneous bandwidth measurements with large fluctuation. The measurements are 1.9 Mbit/s, 1.8 Mbit/s, 0.5 Mbit/s, 0.3 Mbit/s, and 0.5 Mbit/s as shown. The arithmetic mean is the sum of the five instantaneous bandwidth measurements divided by five, which is $$\frac{1.9 \text{ Mbit/s} + 1.8 \text{ Mbit/s} + 0.5 \text{ Mbit/s} + 0.3 \text{ Mbit/s} + 0.5 \text{ Mbit/s}}{5} = 1 \text{ Mbit/s}.$$

In some other embodiments, the initial bandwidth estimate 1010 that the estimation calculator 305 is the median of the pool of instantaneous bandwidth measurements 1005, or some other statistical measure.

The variation calculator 310 receives the pool of instantaneous bandwidth measurements 1005. The variation calculator 310 in some embodiments receives the arithmetic mean 1020 from the estimation calculator 305 when necessary. The variation calculator 310 then computes the standard deviation 1015 of the instantaneous bandwidth measurements. The standard deviation 1015 quantifies the degree of fluctuation of the underlying network connection.

The standard deviation of a statistical population, data set, or probability distribution as mentioned above, is the square root of its variance. The standard deviation 1015 is calculated as follows:

$$\sqrt{\frac{(1.9-1)^2 + (1.8-1)^2 + (0.5-1)^2 + (0.3-1)^2 + (0.5-1)^2}{5}} \text{ Mbit/s} = 0.7 \text{ Mbit/s}.$$

In some other embodiments, instead of computing the standard deviation, the variation calculator 310 computes variance, range, interquartile range, average absolute deviation, coefficient of variation, or some other statistical measures that quantify variation between the instantaneous bandwidth measurements. In some such embodiments, the estimation calculator 305 does not send the initial bandwidth estimate to the variation calculator 310 because the variation calculator may not need the initial bandwidth estimate when the bandwidth variation that the variation calculator calculates is a statistical measure that does not require the initial bandwidth estimate to compute.

The statistics calculator 125 receives the pool of instantaneous bandwidth measurements 1005. Then, the statistics calculator 125 uses the estimation calculator 305 to compute the initial bandwidth estimate 1010. The statistics calculator 125 uses the variation calculator 310 to compute standard deviation 1015. The statistics calculator sends the initial bandwidth estimate 1010 and the standard deviation 1015 to the bandwidth handicapper 130.

The bandwidth handicapper 130 receives the initial bandwidth estimate 1010 and the standard deviation 1015 from the statistics calculator 125. The bandwidth handicapper 130 handicaps the initial bandwidth estimate 1010 by the standard deviation 1015, and then sends out the handicapped bandwidth 175 as revised bandwidth estimate. The bandwidth handicapper 130 may use different statistical measures, such as variance, range, interquartile range, average absolute deviation, and coefficient of variation calculated by the variation calculator 310, to do handicapping in different embodiments.

In this example, the bandwidth handicapper 130 handicaps the initial bandwidth estimate 1010 by one standard deviation 1015. That is, the bandwidth handicapper 130 reduces the initial bandwidth estimate 1010 by one standard deviation 1015. The resulting handicapped bandwidth 175 is:

1 Mbit/s−0.7 Mbit/s=0.3 Mbit/s.

In some embodiments, the bandwidth handicapper handicaps the initial bandwidth estimate 1010 by more than one standard deviation (e.g., by two standard deviations to adopt a more conservative approach).

Since the fluctuation between instantaneous bandwidth measurements 1005 is large as shown, the bandwidth handicapper 130 assumes that the bandwidth is going to be wildly fluctuating in the near future. Handicapping the initial bandwidth estimate 1010 with a standard deviation 1015 that has a large value will create a margin of safety. When the handicapped bandwidth 175 is used to determine the amount of media content data for initial buffering in media content playback, it is likely to ensure an uninterrupted playback.

As illustrated in FIGS. 9 and 10, handicapping the initial bandwidth estimate with standard deviation takes the degree of bandwidth fluctuation into consideration in computing the revised bandwidth estimate. As a result, the revised bandwidth estimate provides an appropriate margin of safety. When the revised bandwidth estimate is used to determine the amount of media content data for initial buffering in media content playback, it is likely to ensure an uninterrupted playback.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
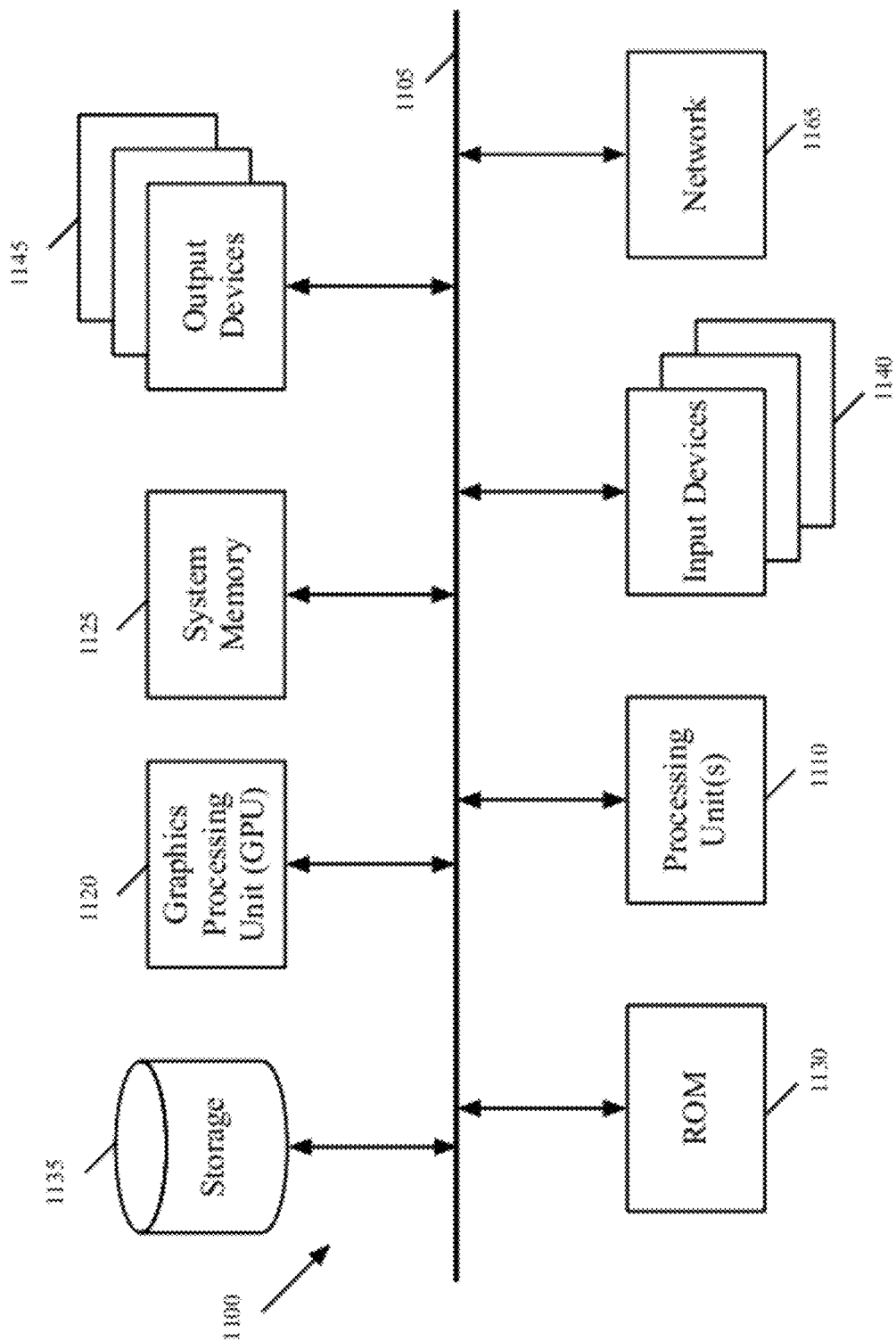
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), phone (e.g., smart phone), PDA, or any other sort of electronic device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110. In some embodiments, such functionality can be provided using CoreImage's kernel shading language.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, or ZIP® disk, and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"). The output devices 1145 display images generated by the electronic system. The output devices 1145 include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a computer program executed by at least one processor, the computer program for receiving sample data blocks containing media content, the computer program comprising sets of instructions for:
    computing an initial bandwidth estimate based on a plurality of bandwidth measurements of a network connection obtained at a plurality of instances of time at a receiving device;
    computing at least one statistical measure that quantifies variation in the bandwidth measurements of the network connection;
    computing a revised bandwidth estimate by reducing the initial bandwidth estimate by a value proportional to the statistical measure;
    determining an amount of media content data to buffer based on the revised bandwidth estimate in order to provide an uninterrupted playback of the media content at the receiving device; and
    starting a playback of the media content when the determined amount of media content data has been buffered.

2. The non-transitory computer readable medium of claim 1, wherein the statistical measure comprises a standard deviation in the bandwidth measurements.

3. The non-transitory computer readable medium of claim 2, wherein the set of instructions for computing the revised bandwidth estimate comprises a set of instructions for reducing the initial bandwidth estimate by a multiple of the computed standard deviation.

4. The non-transitory computer readable medium of claim 1, the computer program further comprising a set of instructions for sending a notification to a client that requested the media content to be played back at the receiving device when the determined amount of media content data has been buffered.

5. A method of estimating bandwidth for receiving media content at a receiving device, the method comprising:
   computing an initial bandwidth estimate based on a plurality of bandwidth measurements of a network connection obtained at a plurality of instances of time at the receiving device;
   computing a standard deviation of the plurality of bandwidth measurements of the network connection;
   computing a revised bandwidth estimate by reducing the initial bandwidth estimate by a multiple of the standard deviation;
   determining an amount of media content to buffer based on the revised bandwidth estimate in order to provide an uninterrupted playback of the media content at the receiving device; and
   starting a playback of the media content when the determined amount of media content has been buffered.

6. The method of claim 5 further comprising sending a notification to a client that requested the media content to be played back at the receiving device when the determined amount of media content data has been buffered.

7. A device for receiving data, the device comprising:
   one or more processors;
   a memory storing software instructions executable by the one or more processors, wherein the software instructions, when executed by the one or more processors, cause the device to:
      compute an initial bandwidth estimate based on a plurality of bandwidth measurements of a network connection obtained at a plurality of instances of time;
      compute at least one statistical measure that quantifies variation in the bandwidth measurements of the network connection;
      compute a revised bandwidth estimate by reducing the initial bandwidth estimate by a value proportional to the statistical measure;
      determine an amount of media content data to buffer based on the revised bandwidth estimate in order to provide an uninterrupted playback of the media content at the device; and
      start a playback of the media content when the determined amount of media content data has been buffered.

8. The device of claim 7, wherein the statistical measure comprises a standard deviation of the bandwidth measurements.

9. The device of claim 8, wherein computing the revised bandwidth estimate comprises reducing the initial bandwidth estimate by a multiple of the computed standard deviation.

* * * * *